United States Patent
Imamura et al.

(10) Patent No.: US 8,370,010 B2
(45) Date of Patent: Feb. 5, 2013

(54) CONTROL APPARATUS FOR POWER TRANSMISSION SYSTEM OF HYBRID VEHICLE

(75) Inventors: Tatsuya Imamura, Okazaki (JP); Yuji Iwase, Mishima (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 378 days.

(21) Appl. No.: 12/449,665

(22) PCT Filed: Aug. 21, 2008

(86) PCT No.: PCT/IB2008/002638
§ 371 (c)(1),
(2), (4) Date: Aug. 20, 2009

(87) PCT Pub. No.: WO2009/024864
PCT Pub. Date: Feb. 26, 2009

(65) Prior Publication Data
US 2010/0138086 A1    Jun. 3, 2010

(30) Foreign Application Priority Data
Aug. 22, 2007    (JP) .................................. 2007-216128

(51) Int. Cl.
*B60L 9/00* (2006.01)
(52) U.S. Cl. ............ 701/22; 701/51; 701/101; 701/103; 180/65.28
(58) Field of Classification Search .................... 701/22, 701/51, 54, 101, 103; 180/69.6, 65.28, 65.285, 180/65.29
See application file for complete search history.

(56) References Cited

U.S. PATENT DOCUMENTS

| 6,170,587 B1 * | 1/2001 | Bullock ....................... 180/69.6 |
| 6,237,709 B1 | 5/2001 | Chubachi |
| 6,340,016 B1 | 1/2002 | Ueda et al. |
| 8,090,520 B2 * | 1/2012 | Tate et al. ..................... 701/104 |
| 2008/0167788 A1 | 7/2008 | Tate et al. |

FOREIGN PATENT DOCUMENTS

| CN | 101234637 A | 8/2008 |
| EP | 1 413 726 A2 | 4/2004 |
| EP | 1 669 578 A1 | 6/2006 |
| JP | A-9-184439 | 7/1997 |
| JP | A-2003-262141 | 9/2003 |

(Continued)

OTHER PUBLICATIONS

Japanese Office Action issued in Japanese Application No. 2007-216128 on Jan. 13, 2012 (with partial translation).

(Continued)

Primary Examiner — Gertrude Arthur Jeanglaude
(74) Attorney, Agent, or Firm — Oliff & Berridge, PLC

(57) ABSTRACT

A stop range changing unit changes an engine stop range, which is a cruise range in which an operation of an engine is stopped, based on a type of fuel that is burned in the engine and that is determined by a fuel type determination unit. Therefore, the engine is stopped or started up under a cruise condition that suits the fuel type. Accordingly, even if start-up performance of the engine varies due to variation of the fuel type, unfavorable effects of the variation in the start-up performance of the engine on a smooth motion of a hybrid vehicle is alleviated.

22 Claims, 10 Drawing Sheets

FOREIGN PATENT DOCUMENTS

| | | |
|---|---|---|
| JP | A-2004-204740 | 7/2004 |
| JP | A-2005-125824 | 5/2005 |
| JP | A-2006-321466 | 11/2006 |
| JP | A-2007-231838 | 9/2007 |
| JP | A-2008-207582 | 9/2008 |
| JP | A-2011-6065 | 1/2011 |

OTHER PUBLICATIONS

Chinese Office Action dated Feb. 14, 2012 issued in Chinese Patent Application No. 200880021441.2 (with translation).

* cited by examiner

| | C0 | C1 | C2 | B0 | B1 | B2 | B3 | GEAR RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | | | | | | | | | |

○ APPLIED  ◎ APPLIED IN STEPPED SHIFT MODE/
RELEASED IN CONTINUOUSLY
VARIABLE SHIFT MODE

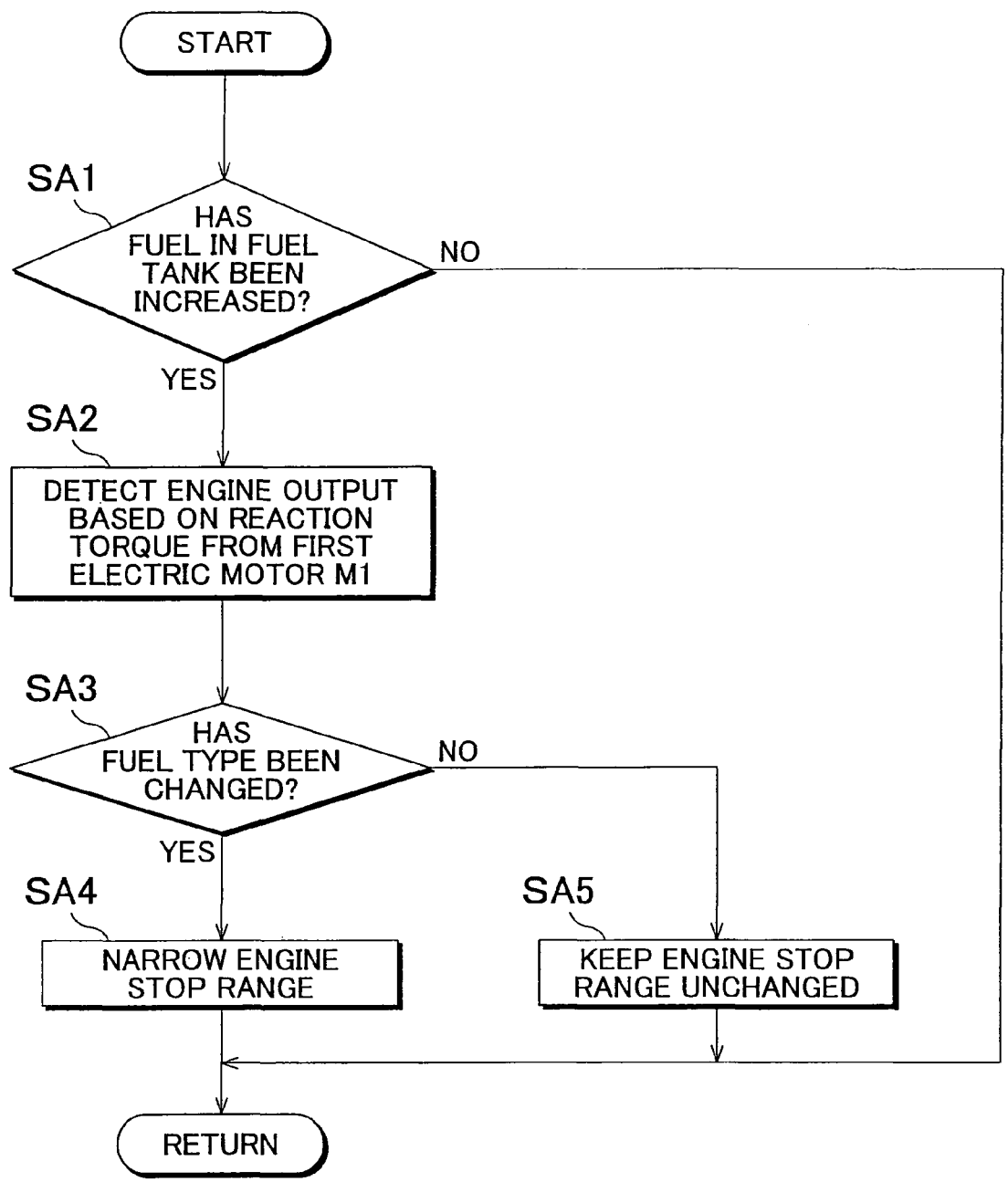

CONTROL APPARATUS FOR POWER TRANSMISSION SYSTEM OF HYBRID VEHICLE

BACKGROUND OF THE INVENTION

1. Field of the Invention

The invention relates to a control apparatus for a power transmission system of a hybrid vehicle. More specifically, the invention relates to a technology for alleviating unfavorable effects, on a smooth motion of the hybrid vehicle, of deterioration of start-up performance of an internal combustion engine, which is caused due to a change in the type of fuel that is supplied to the internal combustion engine.

2. Description of the Related Art

There is a power transmission system for a hybrid vehicle in which drive power output from an internal combustion engine is distributed between a first electric motor and an output member that is connected to drive wheels. When the vehicle travels using the drive power output from the internal combustion engine, a storage unit is charged with electric power produced by the first electric motor. The hybrid vehicle is able to travel using a second electric motor as a drive power source. This type of power transmission system is described in each of Japanese Patent Application Publication No. 2006-321466 (JP-A-2006-321466), Japanese Patent Application Publication No. 2004-204740 (JP-A-2004-204740), and Japanese Patent Application Publication No. 2003-262141 (JP-A-2003-262141). With the control apparatus for the power transmission system according to, for example, JP-A-2006-321466, whether the internal combustion engine should be stopped or driven is determined based on a required torque and a vehicle speed when the vehicle is in motion.

Even in an internal combustion engine that is driven using, for example, petrol (hereinafter referred to as "gasoline"), fuel other than gasoline, for example, biofuel may be used. Accordingly, there has been a demand for development of a vehicle that is able to travel using multiple types of fuel. Supply of multiple types of fuels having different characteristics such as volatilities to the internal combustion engine may affect the ease of igniting the fuel in the internal combustion engine, that is, start-up performance of the internal combustion engine. Ethanol is ignited less easily because it has a lower volatility than that of gasoline. When ethanol blended fuel, which is formed by blending gasoline and ethanol at predetermined blend ratio, is burned in the internal combustion engine, as the ratio of ethanol to the ethanol blended fuel increases, the start-up performance of the internal combustion engine deteriorates more significantly. The start-up performance of the internal combustion engine is especially significant when the temperature of the internal combustion engine is low.

When the start-up performance of the internal combustion engine deteriorates due to a change in the fuel type, the temperature of the fuel, which is compressed and expanded in the internal combustion engine, needs to be promptly increased to a temperature, at which the fuel can be ignited, by, for example, promptly increasing the rotational speed of the internal combustion engine, in order to smoothly start up the internal combustion engine. In this way, the unfavorable effects of deterioration of the start-up performance of the internal combustion engine on a smooth motion of the hybrid vehicle needs to be alleviated. As deterioration of the start-up performance of the internal combustion engine proceeds, the rotational speed of the internal combustion engine at the start-up time needs to be increased. Therefore, the torque produced by the first electric motor and the torque produced by the second electric motor, which are used to increase the rotational speed of the internal combustion engine, need to be increased.

Usually, the rated torque, which is the maximum torque that can be output from an electric motor, decreases as the rotational speed of the electric motor increases. The control apparatus for the power transmission system described in JP-A-2006-321466 is not designed with a possibility that the fuel type may be changed taken into account. Therefore, the control apparatus described in JP-A-2006-321466 does not change the condition for starting up or stopping the internal combustion engine based on the fuel type. Accordingly, the control apparatus does not change the condition for starting up or stopping the internal combustion engine, even if the torque produced by the first electric motor and the torque produced by the second electric motor, which are used to start up the internal combustion engine, need to be increased due to deterioration of the start-up performance of the internal combustion engine. Therefore, for example, when the internal combustion engine is started up while the vehicle speed is high, the rotational speed of the first electric motor and the rotational speed of the second electric motor increase in accordance with the vehicle speed and the rated torque of the first electric motor and the rated torque of the second electric motor are decreased. Accordingly, the internal combustion engine is sometimes not started up smoothly because the torque produced by the first electric motor and the torque produced by the second electric motor, which are used to increase the rotational speed of the internal combustion engine, are insufficient. This may unfavorably affect a smooth motion of the vehicle.

SUMMARY OF THE INVENTION

The invention provides a control apparatus for a power transmission system of a hybrid vehicle, which alleviates unfavorable effects, on a smooth motion of the hybrid vehicle, of deterioration of start-up performance of an internal combustion engine, which is caused due to a change in the characteristic of fuel that is supplied to the internal combustion engine.

A first aspect of the invention relates to a control apparatus for a power transmission system of a hybrid vehicle including an internal combustion engine and an electric motor for driving the hybrid vehicle. With the control apparatus according to the first aspect of the invention, an operation stop range for the internal combustion engine, which is a cruise range in which an operation of the internal combustion engine is stopped, is changed based on a characteristic of fuel that is burned in the internal combustion engine.

According to the aspect of the invention described above, the operation stop range for the internal combustion engine, which is the cruise range in which the operation of the internal combustion engine is stopped, is changed based on the characteristic of fuel that is burned in the internal combustion engine. Therefore, the internal combustion engine is stopped or started up under a cruise condition that suits the fuel characteristic. Accordingly, even if start-up performance of the internal combustion engine varies due to variation of the fuel characteristic, unfavorable effects of the variation of the start-up performance of the internal combustion engine on a smooth motion of the hybrid vehicle is alleviated.

In the aspect of the invention described above, changing the operation stop range for the internal combustion engine based on the characteristic of fuel may be narrowing the operation stop range for the internal combustion engine when start-up performance of the internal combustion engine deteriorates.

In the aspect of the invention described above, when the operation stop range for the internal combustion engine is changed, an operation range for the electric motor for driving the hybrid vehicle, which is a cruise range in which the electric motor is operated, may be kept unchanged.

In the aspect of the invention described above, when the operation stop range for the internal combustion engine is changed, an operation range for the electric motor for driving the hybrid vehicle, which is a cruise range in which the electric motor is operated, may be changed in accordance with the change in the operation stop range for the internal combustion engine.

In the aspect of the invention described above, when the operation stop range for the internal combustion engine is narrowed, the operation range for the electric motor for driving the hybrid vehicle may be narrowed.

According to the aspect of the invention described above, changing the operation stop range for the internal combustion engine based on the fuel characteristic is narrowing the operation stop range for the internal combustion engine when the start-up performance of the internal combustion engine deteriorates. Therefore, in a cruise range in which it is estimated to be difficult to smoothly start up the internal combustion engine due to deterioration of the start-up performance of the internal combustion engine, the internal combustion engine is not stopped. As a result, it is possible to alleviate unfavorable effects of deterioration of the start-up performance of the internal combustion engine on a smooth motion of the hybrid vehicle.

Preferably, changing the operation stop range for the internal combustion engine based on the fuel characteristic is narrowing the operation stop range for the internal combustion engine as deterioration of the start-up performance of the internal combustion engine due to a change in the fuel characteristic proceeds. As deterioration of the start-up performance of the internal combustion engine proceeds, a cruise range, in which it is estimated to be difficult to smoothly start up the internal combustion engine, increases. However, the internal combustion engine is not stopped in such a cruise range, which makes it possible to alleviate unfavorable effects of deterioration of the start-up performance of the internal combustion engine on a smooth motion of the hybrid vehicle.

In the aspect of the invention described above, the operation stop range for the internal combustion engine may be a cruise range in which the operation of the internal combustion engine is determined to be stopped based on a vehicle speed.

In the aspect of the invention described above, the vehicle speed, at which the operation of the internal combustion engine is determined to be stopped, may be lowered when the start-up performance of the internal combustion engine deteriorates.

As the vehicle speed increases, the rotational speed of the electric motor for driving the hybrid vehicle increases. When this electric motor is used to start up the internal combustion engine, as the rotational speed of this electric motor increases, the torque that is produced by this electric motor and that can be used to start up the internal combustion engine decreases. However, according to the aspect of the invention described above, the operation stop range for the internal combustion engine is the cruise range in which the operation of the internal combustion engine is determined to be stopped based on the vehicle speed. Therefore, the internal combustion engine is not stopped in the vehicle speed range in which it is estimated to be difficult to smoothly start up the internal combustion engine because the torque produced by the electric motor for driving the hybrid vehicle is insufficient due to variation of the start-up performance of the internal combustion engine caused by variation of the fuel characteristic. As a result, it is possible to alleviate unfavorable effects of deterioration of the start-up performance of the internal combustion engine on a smooth motion of the hybrid vehicle.

Preferably, as deterioration of the start-up performance of the internal combustion engine proceeds, the operation stop range for the internal combustion engine is narrowed by lowering the upper limit of a vehicle speed range that corresponds to the operation stop range for the internal combustion engine. In this way, when the vehicle speed is high, that is, when the torque that is from the electric motor for driving the hybrid vehicle and that can be used to start up the internal combustion engine is decreased, the internal combustion engine is not stopped. As a result, it is possible to alleviate unfavorable effects of deterioration of the start-up performance of the internal combustion engine on a smooth motion of the hybrid vehicle.

In the aspect of the invention described above, the operation stop range for the internal combustion engine may be a cruise range in which the operation of the internal combustion engine is determined to be stopped based on an accelerator pedal operation amount.

In the aspect of the invention described above, the accelerator pedal operation amount, at which the operation of the internal combustion engine is determined to be stopped, may be decreased when the start-up performance of the internal combustion engine deteriorates.

As the accelerator pedal operation amount increases, the output torque that is required by the hybrid vehicle increases. When the internal combustion engine is stopped, the output torque is output from the electric motor for driving the hybrid vehicle. Therefore, when the electric motor for driving the hybrid vehicle is used to start up the internal combustion engine, the torque that can be used to start up the internal combustion engine, which is calculated by subtracting the torque used to drive the hybrid vehicle from the rated torque of the electric motor for driving the hybrid vehicle, decreases as the accelerator pedal operation amount increases. However, according to the aspect of the invention described above, the operation stop range for the internal combustion engine is the cruise range in which the operation of the internal combustion engine is determined to be stopped based on the accelerator pedal operation mount. Therefore, the internal combustion engine is not stopped in the accelerator pedal operation amount range in which it is estimated to be difficult to smoothly start up the internal combustion engine because the torque produced by the electric motor for driving the hybrid vehicle is insufficient due to variation of the start-up performance of the internal combustion engine caused by variation of the fuel characteristic. As a result, it is possible to alleviate unfavorable effects of deterioration of the start-up performance of the internal combustion engine on a smooth motion of the hybrid vehicle.

Preferably, as deterioration of the start-up performance of the internal combustion engine proceeds, the operation stop range for the internal combustion engine is narrowed by lowering the upper limit of an accelerator pedal operation amount range that corresponds to the operation stop range for the internal combustion engine. In this way, the internal combustion engine is not stopped when the accelerator pedal operation amount is large, that is, when the torque that is from the electric motor for driving the hybrid vehicle and that can be used to start up the internal combustion engine is decreased. As a result, it is possible to alleviate unfavorable effects of deterioration of the start-up performance of the internal combustion engine on a smooth motion of the hybrid vehicle.

In the aspect of the invention described above, the operation stop range for the internal combustion engine may be a cruise range in which the operation of the internal combustion engine is determined to be stopped based on a temperature of the internal combustion engine.

In the aspect of the invention described above, the temperature, at which the operation of the internal combustion engine is determined to be stopped, may be lowered when start-up performance of the internal combustion engine deteriorates.

Deterioration of the start-up performance of the internal combustion engine proceeds as the temperature of the internal combustion engine is decreased. However, according to the aspect of the invention described above, the operation stop range for the internal combustion engine is the cruise range in which the operation of the internal combustion engine is determined to be stopped based on the temperature of the internal combustion engine. Therefore, the internal combustion engine is not stopped in the internal combustion engine temperature range in which it is estimated to be difficult to smoothly start up the internal combustion engine because the torque produced by the electric motor for driving the hybrid vehicle is insufficient due to variation of the start-up performance of the internal combustion engine caused by variation of the fuel characteristic. As a result, it is possible to alleviate unfavorable effects of deterioration of the start-up performance of the internal combustion engine on a smooth motion of the hybrid vehicle.

Preferably, as the temperature of the internal combustion engine decreases, the operation stop range for the internal combustion engine is narrowed by lowering at least one of the upper limit of the vehicle speed range and the upper limit of the accelerator pedal operation amount range that correspond to the operation stop range for the internal combustion engine. In this way, the internal combustion engine is not stopped when the temperature of the internal combustion engine is low, that is, when the start-up performance of the internal combustion engine deteriorates especially significantly due to a change in the fuel characteristic. As a result, it is possible to alleviate unfavorable effects of deterioration of the start-up performance of the internal combustion engine on a smooth motion of the hybrid vehicle.

In the aspect of the invention described above, the characteristic of the fuel may be determined when the amount of fuel in a fuel tank provided in the hybrid vehicle increases.

According to the aspect of the invention described above, the fuel characteristic is determined when the amount of fuel in the fuel tank provided in the hybrid vehicle has been increased. Therefore, a determination is made not always but on an as-required basis, which alleviates a load placed on the control apparatus.

In the aspect of the invention described above, the characteristic of the fuel may be determined when opening of a lid for a fuel inlet of a fuel tank provided in the hybrid vehicle is detected.

According to the aspect of the invention described above, the characteristic of the fuel is determined when opening of the lid for the fuel inlet of the fuel tank provided in the hybrid vehicle is detected. Therefore, a determination is made not always but on an as-required basis, which alleviates a load placed on the control apparatus.

In the aspect of the invention described above, the fuel may be gasoline, and the characteristic of the fuel may be determined by detecting a ratio of ethanol to ethanol-blended-gasoline.

In the aspect of the invention described above, the power transmission system may include an electric differential unit which has a differential mechanism that is arranged between the internal combustion engine and a drive wheel, and a differential electric motor that is connected to the differential mechanism in such a manner that drive power is transmittable between the differential mechanism and the differential electric motor, and in which a differential state of the differential mechanism is controlled by controlling an operation state of the differential electric motor.

According to the aspect of the invention described above, the power transmission system includes the electric differential unit which has the differential mechanism that is arranged between the internal combustion engine and the drive wheel, and the differential electric motor that is connected to the differential mechanism in such a manner that drive power is transmittable between the differential mechanism and the differential electric motor, and in which the differential state of the differential mechanism is controlled by controlling the operation state of the differential electric motor. Therefore, the internal combustion engine is driven independently of the vehicle speed, that is, the rotational speed of the drive wheel. As a result, the fuel efficiency of the vehicle is enhanced. Also, idling the differential electric motor enables the vehicle to travel with the internal combustion engine stopped.

Preferably, deterioration of the start-up performance of the internal combustion engine means an increase in the ratio of the mass of ethanol to the mass of the entire fuel. Preferably, a change in the fuel characteristic means a change in the blend ratio of ethanol to the entire fuel.

When the rotational speed of the internal combustion engine is increased to start up the internal combustion engine, preferably, the electric motor for driving the vehicle produces a reaction torque that counters the rotational resistance of the internal combustion engine.

In the aspect of the invention described above, the stop range for the internal combustion engine may include an operation range for the electric motor, which is a cruise range in which the electric motor is operated, and a cruise range in which both the internal combustion engine and the electric motor are stopped.

A second aspect of the invention relates to a control method for a power transmission system of a hybrid vehicle including an internal combustion engine and an electric motor for driving the hybrid vehicle. According to the control method, an operation stop range for the internal combustion engine, which is a cruise range in which an operation of the internal combustion engine is stopped, is changed based on a characteristic of fuel that is burned in the internal combustion engine.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein:

FIG. 11 is a flowchart showing a main portion of control executed by the electronic control unit in FIG. 4, that is, a control routine for alleviating unfavorable effects, on a smooth motion of the hybrid vehicle, of deterioration of start-up performance of the engine, which is caused due to a change in the fuel characteristic.

DETAILED DESCRIPTION OF EMBODIMENT

Figures 1, 2:
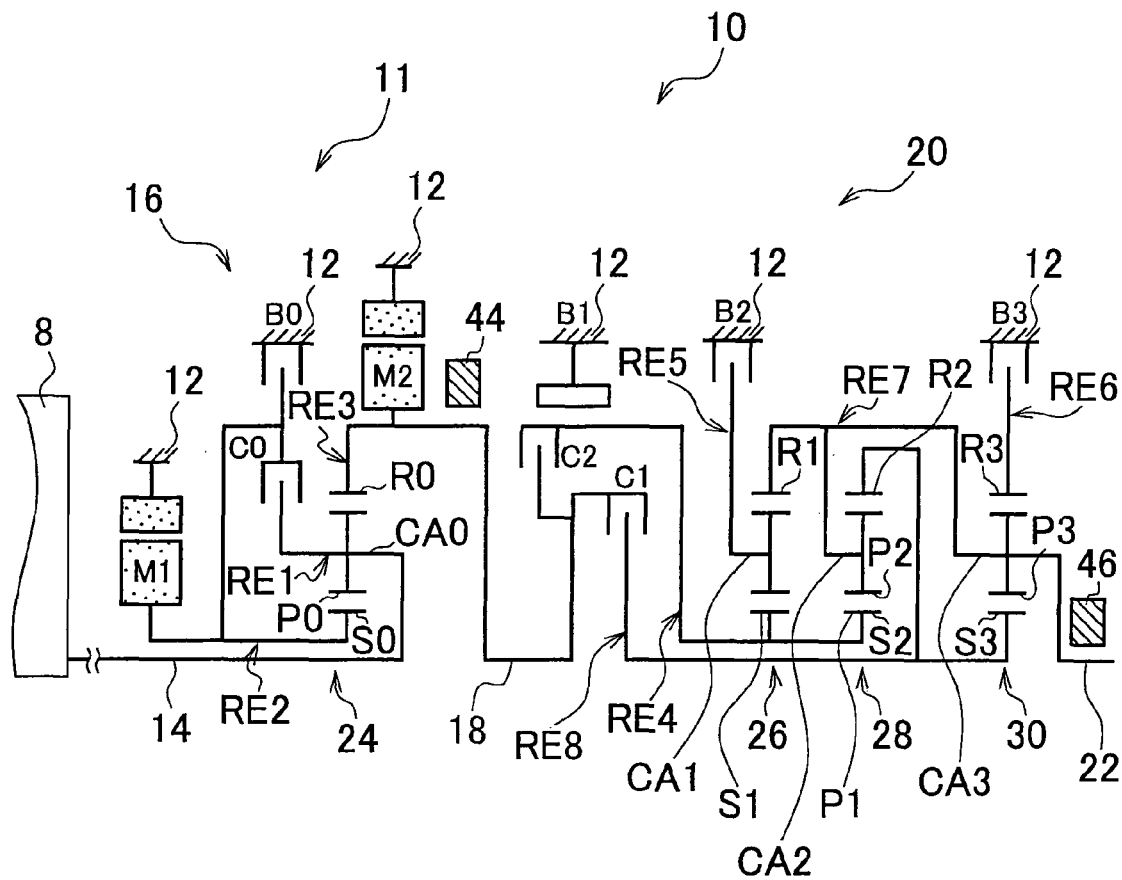
FIG. 1 is a view schematically showing the structure of a shift mechanism that is a power transmission system of a hybrid vehicle to which an example embodiment of the invention is applied.
FIG. 2 is an operation chart showing the relationship between shift operations, which are performed when the hybrid vehicle power transmission system shown in FIG. 1 is made to shift gears in a continuously variable manner or a stepped manner, and the combinations of hydraulic friction application devices that are applied when the shift operations are performed.

FIG. 1 is a view schematically showing a shift mechanism 10 that constitutes part of a hybrid vehicle to which a control apparatus according to an example embodiment of the invention is applied. As shown FIG. 1, the shift mechanism 10, which functions as a power transmission system according to the invention, includes an input shaft 14, a differential unit 11, an automatic shift unit 20, and an output shaft 22, all of which are coaxially arranged in tandem inside a transmission case 12 (hereinafter, simply referred to as "case 12") which is a non-rotating member that is attached to a vehicle body. The input shaft 14 serves as an input rotating member. The differential unit 11 is either directly connected to the input shaft 14 or connected to the input shaft 14 via a pulsation absorbing damper (vibration damping device), not shown. The automatic shift unit 20 is arranged in a power transmission path between the differential unit 11 and a pair of drive wheels 38 (see FIG. 6), and is connected to the differential unit 11 via a transmitting member (transmitting shaft) 18. The output shaft 22 is an output rotating member that is connected to the automatic shift unit 20. The shift mechanism 10 is used in, for example, a FR (front-engine, rear-drive) vehicle in which an engine is longitudinally disposed. The shift mechanism 10 is provided between the drive wheels 38 and an engine 8 that is an internal combustion engine, for example, a gasoline engine or a diesel engine, which serves as a drive power source that produces a drive power used to drive the vehicle. The engine 8 is either directly connected to the input shaft 14 or connected to the input shaft 14 via a pulsation absorbing damper, not shown. This shift mechanism 10 transmits the drive power from the engine 8 to the drive wheels 38 via, for example, a differential gear unit (final reduction device) 36 and a pair of axles, in this order, which constitute part of the power transmission path.

As described above, the engine 8 and the differential unit 11 are directly connected to each other in the shift mechanism 10 of the embodiment of the invention. That is, the engine 8 is connected to the differential unit 11 without provision of a fluid transmission device such as a torque converter or a fluid coupling between the engine 8 and the differential unit 11. Therefore, for example, when the engine 8 is connected to the differential unit 11 via the above-mentioned pulsation absorbing damper, it is regarded that the engine 8 is directly connected to the differential unit 11. Because the configuration of the shift mechanism 10 is symmetric with respect to the axis thereof, the lower portion of the shift mechanism 10 is not shown in FIG. 1.

The differential unit 11 includes a first electric motor M1, a power split mechanism 16, and a second electric motor M2. The power split mechanism 16 is a differential mechanism which distributes the drive power output from the engine 8 to the first electric motor M1 and the transmitting member 18. The second electric motor M2 is provided so as to rotate together with the transmitting member 18. The first electric motor M1 may function as a differential electric motor according to the invention. The second electric motor M2 may function as an electric motor for driving the hybrid vehicle according to the invention. The first electric motor M1 and the second electric motor M2 in the embodiment of the invention are both so-called motor-generators that also function as generators. The first electric motor M1 functions as at least a generator (is able to generate electricity) that generates a reaction force, and the second electric motor M2 functions as at least a motor (electric motor) that outputs drive power. The second electric motor M2 serves as a drive power source that produces the drive power used to drive the vehicle.

The power split mechanism 16 mainly includes a single-pinion differential planetary gear unit 24 having a predetermined gear ratio $\rho 0$ of, for example, approximately 0.418, a switching clutch C0, and a switching brake B0. The differential planetary gear unit 24 includes rotating elements, that is, a differential sun gear S0, differential pinions P0, a differential carrier CA0 which supports the differential pinions P0 in such a manner that the differential pinions P0 are allowed to rotate about their axes and turn around the differential sun gear S0, and a differential ring gear R0 that is in mesh with the differential sun gear S0 via the differential pinions P0. When the number of teeth on the differential sun gear S0 is ZS0 and the number of teeth on the differential ring gear R0 is ZR0, the gear ratio $\rho 0$ is expressed as ZS0/ZR0. The power split mechanism 16 may function as a differential mechanism according to the invention.

In the power split mechanism 16, the differential carrier CA0 is connected to the engine 8 via the input shaft 14, the differential sun gear S0 is connected to the first electric motor M1, and the differential ring gear R0 is connected to the transmitting member 18. The switching brake B0 is provided between the differential sun gear S0 and the case 12, and the switching clutch C0 is provided between the differential sun gear S0 and the differential carrier CA0. Releasing both the switching clutch C0 and the switching brake B0 enables the three rotating elements of the differential planetary gear unit 24, that is, the differential sun gear S0, the differential carrier CA0, and the differential ring gear R0 to rotate relative to each other, thus placing the power split mechanism 16 in the differential mode in which the power split mechanism 16 performs differential operation. Therefore, the drive power output from the engine 8 is distributed to the first electric motor M1 and the transmitting member 18. Part of the drive power output from the engine 8, which is distributed to the first electric motor M1, is used to run the first electric motor M1 to generate electricity. The generated electricity is stored, or used to run the second electric motor M2. Accordingly, the differential unit 11 (power split mechanism 16) functions as an electric differential device. For example, the differential unit 11 may be placed in the so-called continuously variable shift mode (electric CVT mode) and the rotational speed of the transmitting member 18 is continuously changed even when the engine 8 is operating at a constant speed. When the power split mechanism 16 is placed in the differential mode, the differential unit 11 is also placed in the differential mode. Accordingly, the differential unit 11 is placed in the continuously variable shift mode in which the differential unit 11 functions as an electric continuously variable transmission of which the gear ratio $\gamma 0$ (rotational speed of the input shaft 14/rotational speed of the transmitting member 18) is continuously changed within a gear ratio range from a minimum value $\gamma 0 min$ to a maximum value $\gamma 0 max$. When the power split mechanism 16 is placed in the differential mode, the operating states of the first electric motor M1 that is connected to the power split mechanism 16 (differential unit 11) in such a manner that power is transmittable between the first electric motor M1 and the power split mechanism 16, the second electric motor M2 and the engine 8 are controlled, whereby the differential state of the power split mechanism 16, that is, the ratio between the rotational speed of the input shaft 14 and the rotational speed of the transmitting member 18 is controlled.

When the switching clutch C0 or the switching brake B0 is applied, the power split mechanism 16 is placed in the non-differential mode in which the power split mechanism 16 cannot perform the differential operation. More specific description will be provided below. When the switching clutch C0 is applied and therefore the differential sun gear S0 and the differential carrier CA0 are connected to each other, the power split mechanism 16 is placed in the locked mode in which the three rotating elements of the planetary gear unit 24, that is, the differential sun gear S0, the differential carrier CA0, and the differential ring gear R0 are rotated together, in other words, the power split mechanism 16 is placed in the non-differential mode in which the power split mechanism 16 cannot perform the differential operation. As a result, the differential unit 11 is also placed in the non-differential mode. Also, the rotational speed of the engine 8 matches the rotational speed of the transmitting member 18. Therefore, the differential unit 11 (power split mechanism 16) is placed in the fixed shift mode, that is, the stepped shift mode, in which the differential unit 11 functions as a transmission of which the gear ratio $\gamma 0$ is fixed at L When the switching brake B0 is applied instead of the switching clutch C0 and therefore the differential sun gear S0 is locked to the case 12, the power split mechanism 16 is placed in the locked mode in which the differential sun gear S0 is not allowed to rotate, in other words, the power split mechanism 16 is placed in the non-differential mode in which the power split mechanism 16 cannot perform the differential operation. As a result, the differential unit 11 is also placed in the non-differential mode. The differential ring gear R0 rotates faster than the differential carrier CA0. Therefore, the power split mechanism 16 functions as a speed increasing mechanism, and the differential unit 11 (power split mechanism 16) is placed in the fixed shift mode, that is, the stepped shift mode, in which the differential unit 11 functions as a speed increasing transmission of which the gear ratio $\gamma 0$ is fixed at a value less than 1, for example, approximately 0.7.

As described above, the switching clutch C0 and the switching brake B0 in the embodiment of the invention function as differential mode switching devices that selectively switch the shift mode of the differential unit 11 (power split mechanism 16) between the differential mode, i.e., the unlocked mode, and the non-differential mode, i.e., the locked mode. More specifically, the switching clutch C0 and the switching brake B0 function as differential mode switching devices that selectively switch the shift mode of the differential unit 11 (power split mechanism 16) between i) the differential mode in which the differential unit 11 (power split mechanism 16) functions as an electric differential device, for example, the continuously variable shift mode in which the differential unit 11 (power split mechanism 16) functions as an electric continuously variable transmission of which the gear ratio is changed continuously, and ii) the shift mode in which the differential unit 11 (power split mechanism 16) does not perform the electric continuously variable shift operation, for example, the locked mode in which the differential unit 11 (power split mechanism 16) does not function as a continuously variable transmission and the gear ratio is fixed at a predetermined value, namely, the fixed shift mode (non-differential mode) in which the differential unit 11 (power split mechanism 16) functions as a single-speed transmission having one gear ratio or a multi-speed transmission having multiple gear ratios, which cannot perform the electric continuously variable shift operation.

The automatic shift unit 20 is a shift unit that functions as a stepped automatic transmission that is able to change the gear ratio (=rotational speed $N_{18}$ of the transmitting member 18/rotational speed $N_{OUT}$ of the output shaft 22) in a stepwise manner. The automatic shift unit 20 includes a single-pinion first planetary gear unit 26, a single-pinion second planetary gear unit 28, and a single-pinion third planetary gear unit 30. The first planetary gear unit 26 includes a first sun gear S1, first pinions P1, a first carrier CA1 which supports the first pinions P1 in such a manner that the first pinions 1 are allowed to rotate about their axes and turn around the first sun gear S1, and a first ring gear R1 that is in mesh with the first sun gear S1 via the first pinions P1. The first planetary gear unit 26 has a predetermined gear ratio $\rho 1$ of, for example, approximately 0.562. The second planetary gear unit 28 includes a second sun gear S2, second pinions P2, a second carrier CA2 which supports the second pinions P2 in such a manner that the second pinions P2 are allowed to rotate about their axes and turn around the second sun gear S2, and a second ring gear R2 that is in mesh with the second sun gear S2 via the second pinions P2. The second planetary gear unit 28 has a predetermined gear ratio $\rho 2$ of, for example, approximately 0.425. The third planetary gear unit 30 includes a third sun gear S3, third pinions P3, a third carrier CA3 which supports the third pinions P3 in such a manner that the third pinions P3 are allowed to rotate about their axes and turn around the third sun gear S3, and a third ring gear R3 that is in mesh with the third sun gear S3 via the third pinions P3. The third planetary gear unit 30 has a predetermined gear ratio ρ3 of, for example, approximately 0.421. When the number of teeth on the first sun gear S1 is ZS1, the number of the teeth on the first ring gear R1 is ZR1, the number of teeth on the second sun gear S2 is ZS2, the number of teeth on the second ring gear R2 is ZR2, the number of teeth on the third sun gear S3 is ZS3, and the number of teeth on the third ring gear R3 is ZR3, the gear ratio ρ1 is expressed as ZS1/ZR1, the gear ratio ρ2 is expressed as ZS2/ZR2, and the gear ratio ρ3 is expressed as "ZS3/ZR3".

In the automatic shift unit 20, the first sun gear S1 and the second sun gear S2 are connected to each other, and selectively connected to the transmitting member 18 via the second clutch C2. Also, the first sun gear S1 and the second sun gear S2 are selectively connected to the case 12 via the first brake B1. The first carrier CA1 is selectively connected to the case 12 via the second brake B2. The third ring gear R3 is selectively connected to the case 12 via the third brake B3. The first ring gear R1, the second carrier CA2, and the third carrier CA3 are connected to each other, and selectively connected to the output shaft 22. The second ring gear R2 and the third sun gear S3 are connected to each other, and selectively connected to the transmitting member 18 via the first clutch C1. In this way, the automatic shift unit 20 and the transmitting member 18 are connected to each other via one of the first clutch C1 and the second clutch C2 which are used to select the gear of the automatic shift unit 20. In other words, the first clutch C1 and the second clutch C2 function as application devices that change the state of the power transmission path which extends between the transmitting member 18 and the automatic shift unit 20, i.e., which extends between the differential unit 11 (transmitting member 18) and the drive wheels 38. The state of the power transmission path is changed between the power transmittable state in which the drive power is allowed to be transmitted along that power transmission path and the power transmission-interrupted state in which transmission of the drive power along that power transmission path is interrupted. That is, applying at least one of the first clutch C1 and the second clutch C2 places the power transmission path in the power transmittable state. Conversely, releasing both the first clutch C1 and the second clutch C2 places the power transmission path in the power transmission-interrupted state.

The switching clutch C0, the first clutch C1, the second clutch C2, the switching brake B0, the first brake B1, the second brake B2, and the third brake B3 are hydraulic friction application devices that are used in vehicle stepped automatic transmissions. The clutches may be wet multiple-disc clutches in which a plurality of stacked friction plates are pressed together by a hydraulic actuator, and the brakes may be band brakes in which one end of one or two bands that are wound around the outer peripheral surface of a rotating drum is pulled tight by a hydraulic actuator. Each hydraulic friction application device selectively connects members, located on both sides of the hydraulic friction application device, to each other.

In the shift mechanism 10 structured as described above, gear is selected from among forward gears from first gear through fifth gear, reverse gear, and neutral. The desired gear is selected by selectively applying the switching clutch C0, the first clutch C1, the second clutch C2, the switching brake B0, the first brake B1, the second brake B2, and the third brake B3 in the combination shown in the operation chart in FIG. 2. Thus, the gear ratio γ(=rotational speed $N_{IN}$ of the input shaft/rotational speed $N_{OUT}$ of the output shaft) at each gear is achieved. The ratios between the gear ratios γ of the adjacent gears are substantially equal to each other. In the embodiment of the invention, the power split mechanism 16 is provided with the switching clutch C0 and the switching brake B0. The differential unit 11 may be placed in the continuously variable shift mode in which the differential unit 11 functions as a continuously variable transmission. Alternatively, the differential unit 11 may be placed in the fixed shift mode in which the differential unit 11 functions as a transmission having a fixed gear ratio, by applying one of the switching clutch C0 and the switching brake B0. Accordingly, the shift mechanism 10 may be placed in the stepped shift mode in which the shift mechanism 10 operates as a stepped transmission using the automatic shift unit 20 and the differential unit 11 that is placed in the fixed shift mode by applying one of the switching clutch C0 and the switching brake B0. Alternatively, the shift mechanism 10 may be placed in the continuously variable shift mode in which the shift mechanism 10 operates as an electric continuously variable transmission using the automatic shift unit 20 and the differential unit 11 that is placed in the continuously variable shift mode by keeping both the switching clutch C0 and the switching brake B0 released. In other words, the shift mechanism 10 is placed in the stepped shift mode by applying one of switching clutch C0 and the switching brake B0, and placed in the continuously variable shift mode by keeping both the switching clutch C0 and the switching brake B0 released. The differential unit 11 may also be regarded as a transmission that is switched between the stepped shift mode and the continuously variable shift mode.

For example, when the shift mechanism 10 functions as a stepped transmission, one of the gears described below is selected as shown in the operation chart in FIG. 2. First gear that has the highest gear ratio γ1, for example, approximately 3.357, is selected by applying the switching clutch C0, the first clutch C1, and the third brake B3. Second gear that has a gear ratio γ2 lower than that of first gear, for example, approximately 2.180, is selected by applying the switching clutch C0, the first clutch C1, and the second brake B2. Third gear that has a gear ratio γ3 lower than that of second gear, for example, approximately 1.424, is selected by applying the switching clutch C0, the first clutch C1, and the first brake B1. Fourth gear that has a gear ratio γ4 lower than that of third gear, for example, approximately 1.000, is selected by applying the switching clutch C0, the first clutch C1, and the second clutch C2. Fifth gear that has a gear ratio γ5 lower than that of fourth gear, for example, approximately 0.705, is selected by applying the first clutch C1, the second clutch C2, and the switching brake B0. Reverse gear that has a gear ratio γR between the gear ratio of first gear and the gear ratio of second gear, for example, approximately 3.209, is selected by applying the second clutch C2 and the third brake B3. When the automatic shift unit 20 is placed in Neutral, all of the clutches C0, C1 and C2 and brakes B0, B1, B2 and B3 are released.

However, when the shift mechanism 10 functions as a continuously variable transmission, both the switching clutch C0 and the switching brake B0 are released as shown in the operation chart in FIG. 2. Thus, when the differential unit 11 functions as a continuously variable transmission and the automatic shift unit 20, which is arranged in tandem with the differential unit 11, functions as a stepped transmission, the rotational speed of the transmitting member 18, that is, the rotational speed that is input to the automatic shift unit 20, which is at one of first gear, second gear, third gear, and fourth gear, is continuously changed so that gear ratio of each gear is allowed to change continuously. Accordingly, the gears are changed while the gear ratio is continuously changed. As a result, the total gear ratio γT, which is achieved by the entire shift mechanism 10, is continuously changed. The ratio of the gear ratio at a gear to a gear ratio at an adjacent higher gear (i.e., step) is shown in the section "STEP" in FIG. 2. As shown in the section "TOTAL" in FIG. 2, the ratio of the gear ratio at first gear to the gear ratio at the fifth gear is 4.76.

Figure 3:
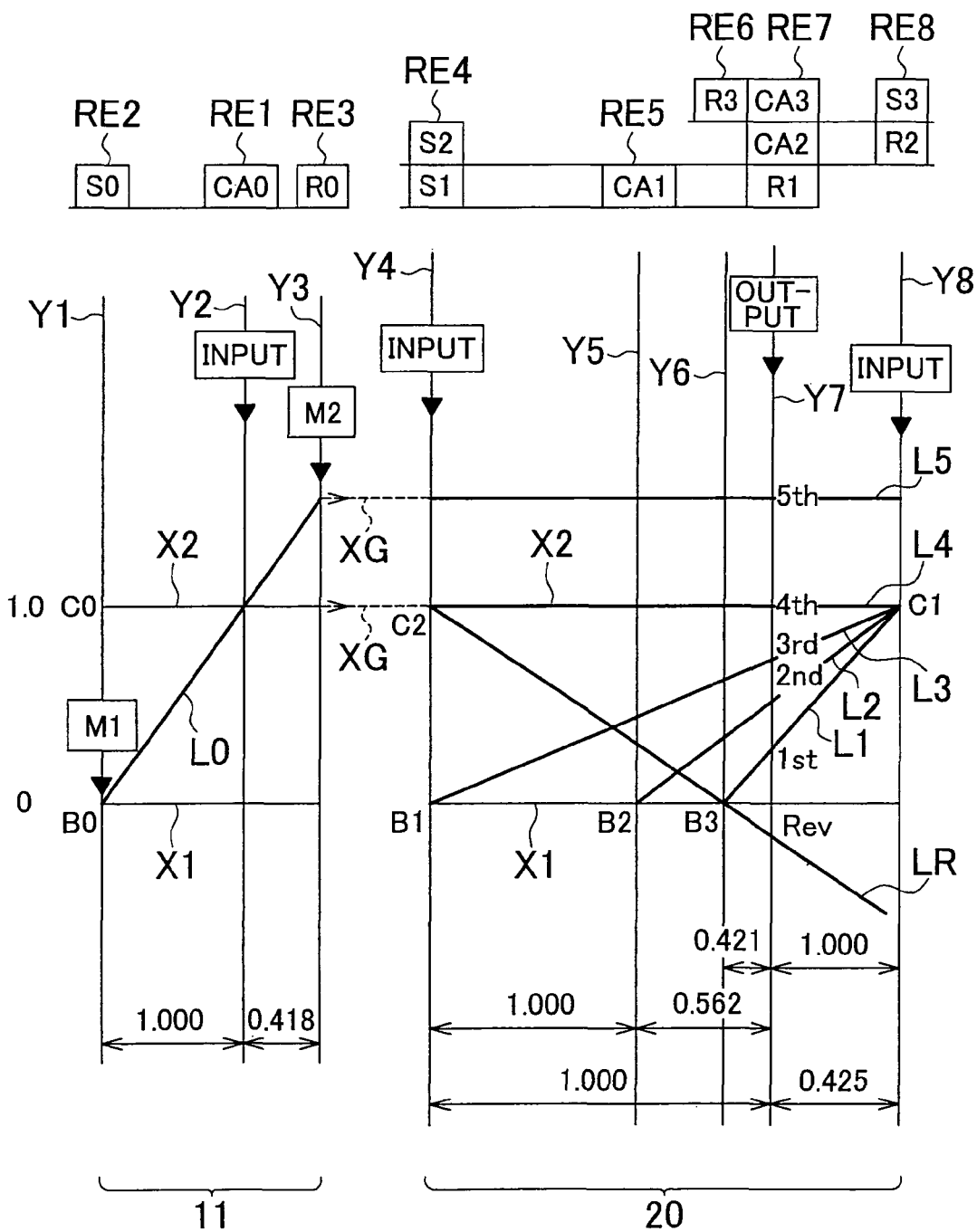
FIG. 3 is a collinear diagram illustrating the relative rotational speed in each gear when the hybrid vehicle power transmission system shown in FIG. 1 is made to shift gears in a stepped manner.

FIG. 3 is a collinear diagram that shows, using straight lines, the correlative relationships among the rotational speeds of the various rotating elements of the shift mechanism 10. The connection states of the rotating elements vary depending on the selected gear. The shift mechanism 10 includes the differential unit 11 that functions as a continuously variable transmission or a first shift unit and the automatic shift unit 20 that functions as a stepped transmission or a second shift unit. The collinear diagram in FIG. 3 is a two-dimension coordinate system in which the abscissa axis represents the relationship among the gear ratios ρ of the planetary gear units 24, 26, 28, and 30, and ordinate axis represents the relative rotational speeds. Among three horizontal lines, the lower horizontal line X1 represents a rotational speed of zero, the upper horizontal line X2 represents a rotational speed of 1.0, i.e., the rotational speed $N_E$ of the engine 8 that is connected to the input shaft 14, and the horizontal line XG represents the rotational speed of the transmitting member 18.

Also, the three vertical lines Y1, Y2, and Y3 which correspond to the three elements of the power split mechanism 16 that forms the differential unit 11 represent, in order from left to right, the relative-rotational speeds of the differential sun gear S0 that is regarded as a second rotating element (second element) RE2, the differential carrier CA0 that is regarded as a first rotating element (first element) RE1, and the differential ring gear R0 that is regarded as a third rotating element (third element) RE3. The interval between the vertical lines Y1 and Y2, and the interval between the vertical lines Y2 and Y3 are determined based on the gear ratio ρ0 of the differential planetary gear unit 24. Further, the five vertical lines Y4, Y5, Y6, Y7, and Y8 for the automatic shift unit 20 represent, in order from left to right, the relative rotational speeds of the first sun gear S1 and the second sun gear S2 which are connected to each other and which are regarded as a fourth rotating element (fourth element) RE4, the first carrier CA1 which is regarded as a fifth rotating element (fifth element) RE5, the third ring gear R3 which is regarded as a sixth rotating element (sixth element) RE6, the first ring gear R1, the second carrier CA2, and the third carrier CA3 which are connected to each other and which are regarded as a seventh rotating element (seventh element) RE7, and the second ring gear R2 and the third sun gear S3 which are connected to each other and which are regarded as an eighth rotating member (eighth element) RE8. The interval between the vertical lines Y4 and Y5, the interval between the vertical lines Y5 and Y6, the interval between the vertical lines Y6 and Y7, and the interval between the vertical lines Y7 and Y8 are determined based on the gear ratio ρ1 of the first planetary gear unit 26, the gear ratio ρ2 of the second planetary gear unit 28, and the gear ratio ρ3 of the third planetary gear unit 30. In the relationships among the intervals between the vertical lines in the collinear diagram, when the interval between the vertical line corresponding to the sun gear and the vertical line corresponding to the carrier is expressed by "1", the interval between the vertical line corresponding to the carrier and the vertical line corresponding to the ring gear is expressed by the gear ratio ρ of the planetary gear unit. That is, in the coordinate system for the differential unit 11, the interval between the vertical lines Y1 and Y2 is set to an interval corresponding to 1, and the interval between vertical lines Y2 and Y3 is set to an interval corresponding to the gear ratio ρ0. Similarly, in the coordinate system for the automatic shift unit 20, the interval between the vertical line corresponding to the sun gear and the vertical line corresponding to the carrier is set to an interval corresponding to 1, and the interval between the vertical line corresponding to the carrier and the vertical line corresponding to the ring gear is set to an interval corresponding to the gear ratio ρ, at each of the first, second, and third planetary gear units 26, 28, and 30.

As illustrated in the collinear diagram in FIG. 3, the shift mechanism 10 in the embodiment of the invention is structured so that the power split mechanism 16 (differential unit 11) transmits the rotation of the input shaft 14 to the automatic shift unit (stepped transmission) 20 via the transmitting member 18 when the first rotating element RE1 (differential carrier CA0) of the differential planetary gear unit 24 is connected to the engine 8 via the input shaft 14 and is selectively connected to the second rotating element RE2 (differential sun gear S0) via the switching clutch C0, the second rotating element RE2 is connected to the first electric motor M1 and is selectively connected to the case 12 via the switching brake B0, and the third rotating element RE3 (differential ring gear R0) is connected to the transmitting member 18 and the second electric motor M2. The relationship between the rotational speed of the differential sun gear S0 and the rotational speed of the differential ring gear R0 at this time is shown by the sloped straight line L0 that passes through the point of intersection of Y2 and X2.

When the switching clutch C0 and the switching brake B0 are both released, the power split mechanism 16 is placed in the continuously variable shift mode (differential mode). In this case, when the rotational speed of the differential sun gear S0, represented by the point of intersection of the straight line L0 and the vertical line Y1, is increased or decreased by controlling the rotational speed of the first electric motor M1, if the rotational speed of the differential ring gear R0, which depends on the vehicle speed V, is substantially constant, the rotational speed of the differential carrier CA0 represented by the point of intersection of the straight line L0 and the vertical line Y2 is increased or decreased. When the differential sun gear S0 and the differential carrier CA0 are connected to each other by applying the switching clutch C0, the power split mechanism 16 is placed in the non-differential mode in which the three rotating elements RE1, RE2, and RE3 rotate together. Therefore, the straight line L0 matches the horizontal line X2, and the transmitting member 18 rotates at the same speed as the engine speed $N_E$. Alternatively, when the rotation of the differential sun gear S0 is stopped by applying the switching brake B0, the power split mechanism 16 is placed in the non-differential mode in which the power split mechanism 16 functions as a speed increasing mechanism. Therefore, the straight line L0 is brought into the state shown in FIG. 3, and the rotational speed of the differential ring gear R0 represented by the point of intersection of the straight line L0 and the vertical line Y3, i.e., the rotational speed of the transmitting member 18, is input in the automatic shift unit 20. At this time, the rotational speed of the transmitting member 18 is higher than the engine speed $N_E$.

In the automatic shift unit 20, the fourth rotating element RE4 is selectively connected to the transmitting member 18 via the second clutch C2, and selectively connected to the case 12 via the first brake B1. The fifth rotating element RE5 is selectively connected to the case 12 via the second brake B2. The sixth rotating element RE6 is selectively connected to the case 12 via the third brake B3. The seventh rotating element RE7 is connected to the output shaft 22. The eighth rotating element RE8 is selectively connected to the transmitting member 18 via the first clutch C1.

When the switching clutch C0, the first clutch C1 and the third brake B3 are applied, first gear is selected. As illustrated in FIG. 3, in the coordinate system for the automatic shift unit 20, the rotational speed of the output shaft 22 in first gear is shown at the point of intersection of i) the sloped straight line L1 that is defined by application of both the first clutch C1 and the third brake B3 and that passes through both the point of intersection of the horizontal line X2 and the vertical line Y8 which represents the rotational speed of the eighth rotating element RE8 and the point of intersection of the horizontal line X1 and the vertical line Y6 which represents the rotational speed of the sixth rotating element RE6, and ii) the vertical line Y7 that represents the rotational speed of the seventh rotating element RE7 which is connected to the output shaft 22. When the switching clutch C0, the first clutch C1 and the second brake B2 are applied, second gear is selected. The rotational speed of the output shaft 22 in second gear is shown at the point of intersection of the sloped straight line L2, which is defined by application of both the first clutch C1 and the second brake B2, and the vertical line Y7 that represents the rotational speed of the seventh rotating element RE7 which is connected to the output shaft 22. When the switching clutch C0, the first clutch C1 and the first brake B1 are applied, third gear is selected. The rotational speed of the output shaft 22 in third gear is shown at the point of intersection of the sloped straight line L3, which is defined by application of both the first clutch C1 and the first brake B1, and the vertical line Y7 that represents the rotational speed of the seventh rotating element RE7 which is connected to the output shaft 22. When the switching clutch C0, the first clutch C1 and the second clutch C2 are applied, fourth gear is selected. The rotational speed of the output shaft 22 in fourth gear is shown at the point of intersection of the horizontal straight line L4, which is defined by application of both the first clutch C1 and the second clutch C2, and the vertical line Y7 that represents the rotational speed of the seventh rotating element RE7 which is connected to the output shaft 22. When each of first gear, second gear, third gear, and fourth gear is selected, the switching clutch C0 is applied. Therefore, the rotation having the same speed as the engine speed $N_E$ is transmitted from the differential unit 11, i.e., the power split mechanism 16 to the eighth rotating element RE8. However, if the switching brake B0 is applied instead of the switching clutch C0, the rotation having a speed higher than the engine speed $N_E$ is transmitted from the differential unit 11 to the eighth rotating element RE8. Therefore, the rotational speed of the output shaft 22 in fifth gear is shown at the point of intersection of the horizontal straight line L5, which is defined by application of all the first clutch C1, the second clutch C2, and the switching brake B0, and the vertical line Y7 that represents the rotational speed of the seventh rotating element RE7 which is connected to the output shaft 22.

Figure 4:
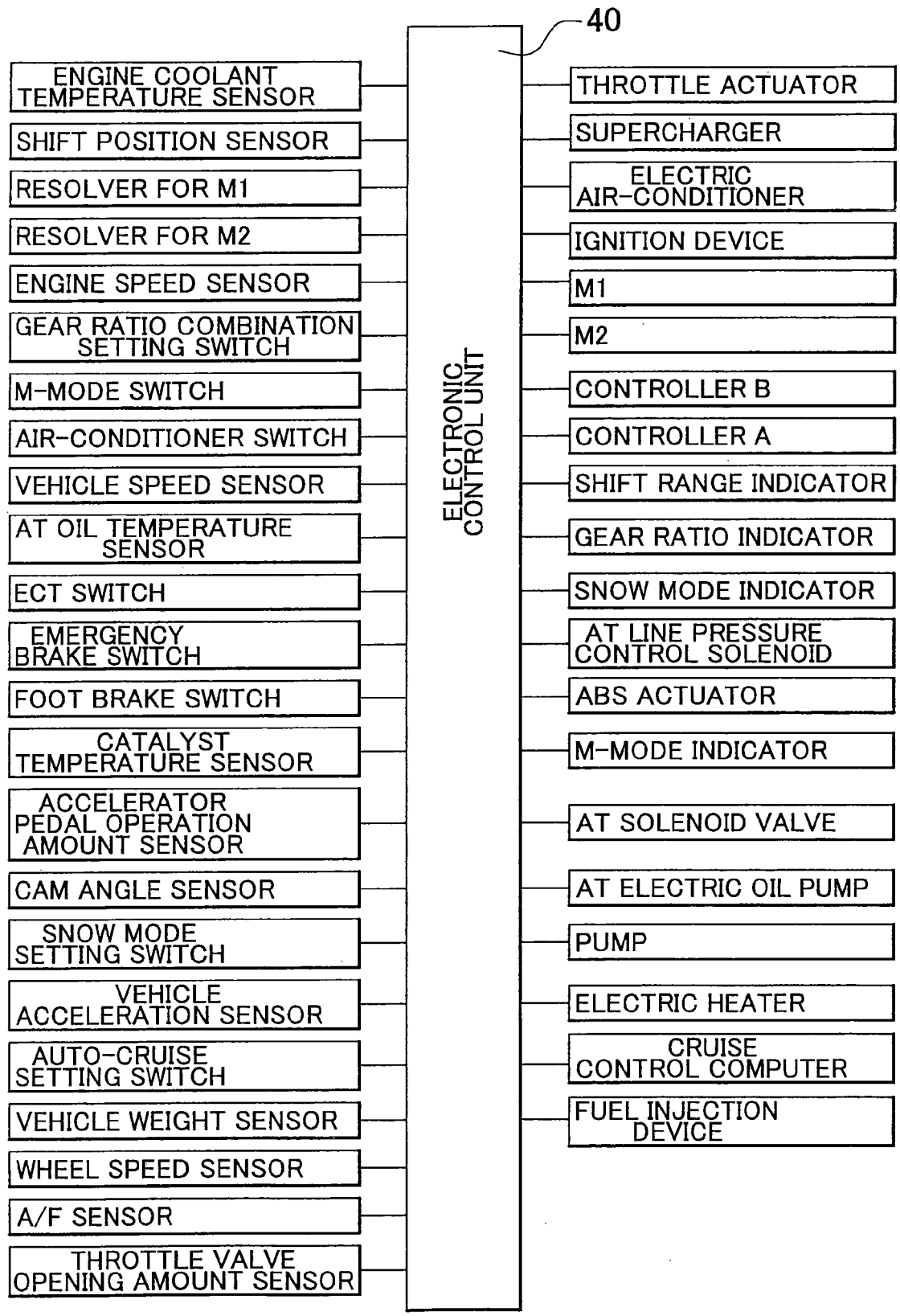
FIG. 4 is a diagram showing signals input in/output from an electronic control unit provided in the hybrid vehicle power transmission system shown in FIG. 1.

FIG. 4 shows examples of signals input in (received by) and output from an electronic control unit 40 which is a control unit that controls the shift mechanism 10 which constitute part of the power transmission system for a hybrid vehicle according to the embodiment of the invention. The electronic control unit 40 includes a so-called microcomputer that has a CPU, a ROM, a RAM, an input interface, an output interface, etc. The electronic control unit 40 executes drive controls such as shift control over the automatic shift unit 20 and hybrid drive control related to the engine 8 and the first and second electric motors M1 and M2, by processing the signals according to programs prestored in the ROM while using the temporary storage function of the RAM.

Various signals are transmitted to the electronic control unit 40 from various sensors and switches shown in FIG. 4. These signals include a signal indicating an engine coolant temperature $TEMP_W$, a signal indicating a shift position $P_{SH}$, a signal indicating a rotational speed $N_{M1}$ of the first electric motor M1 that is detected by a rotational speed sensor such as a resolver (hereinafter, referred to as "first electric motor rotational speed $N_{M1}$") and a rotational direction of the first electric motor M1, a signal indicating a rotational speed $N_{M2}$ of the second electric motor M2 that is detected by a rotational speed sensor 44 (see FIG. 1) such as a resolver (hereinafter, referred to as "second electric motor rotational speed $N_{M2}$") and a rotational direction of the second electric motor M2, a signal indicating an engine speed $N_E$ which is the rotational speed of the engine 8, a signal indicating a gear ratio combination setting value, a signal indicating a command to select the M-mode (manual shift running mode), a signal indicating operation of an air-conditioner, a signal indicating a vehicle speed V that corresponds to the rotational speed $N_{OUT}$ of the output shaft 22 which is detected by a vehicle speed sensor 46 (see FIG. 1) and a traveling direction of the vehicle, a signal indicating a temperature of the hydraulic fluid in the automatic shift unit 20, a signal indicating operation of an emergency brake, a signal indicating operation of a footbrake, a catalyst temperature signal indicating a catalyst temperature, and an accelerator pedal operation amount signal indicating an accelerator pedal operation amount $A_{CC}$ which corresponds to the amount of drive power required by a driver, a cam angle signal, a snow mode setting signal indicating a snow mode setting, an acceleration signal indicating a longitudinal acceleration of the vehicle, an auto-cruise signal indicating auto-cruise running, a vehicle weight signal indicating a vehicle weight; wheel speed signals indicating wheel speeds, and a signal indicating an air-fuel ratio A/F in the engine 8. Each of the rotational speed sensor 44 and the vehicle speed sensor 46 is a sensor that is able to detect not only a rotational speed but also a rotational direction. When the automatic shift unit 20 is in Neutral while the vehicle is traveling, the traveling direction of the vehicle is detected by the vehicle speed sensor 46.

Figure 6:
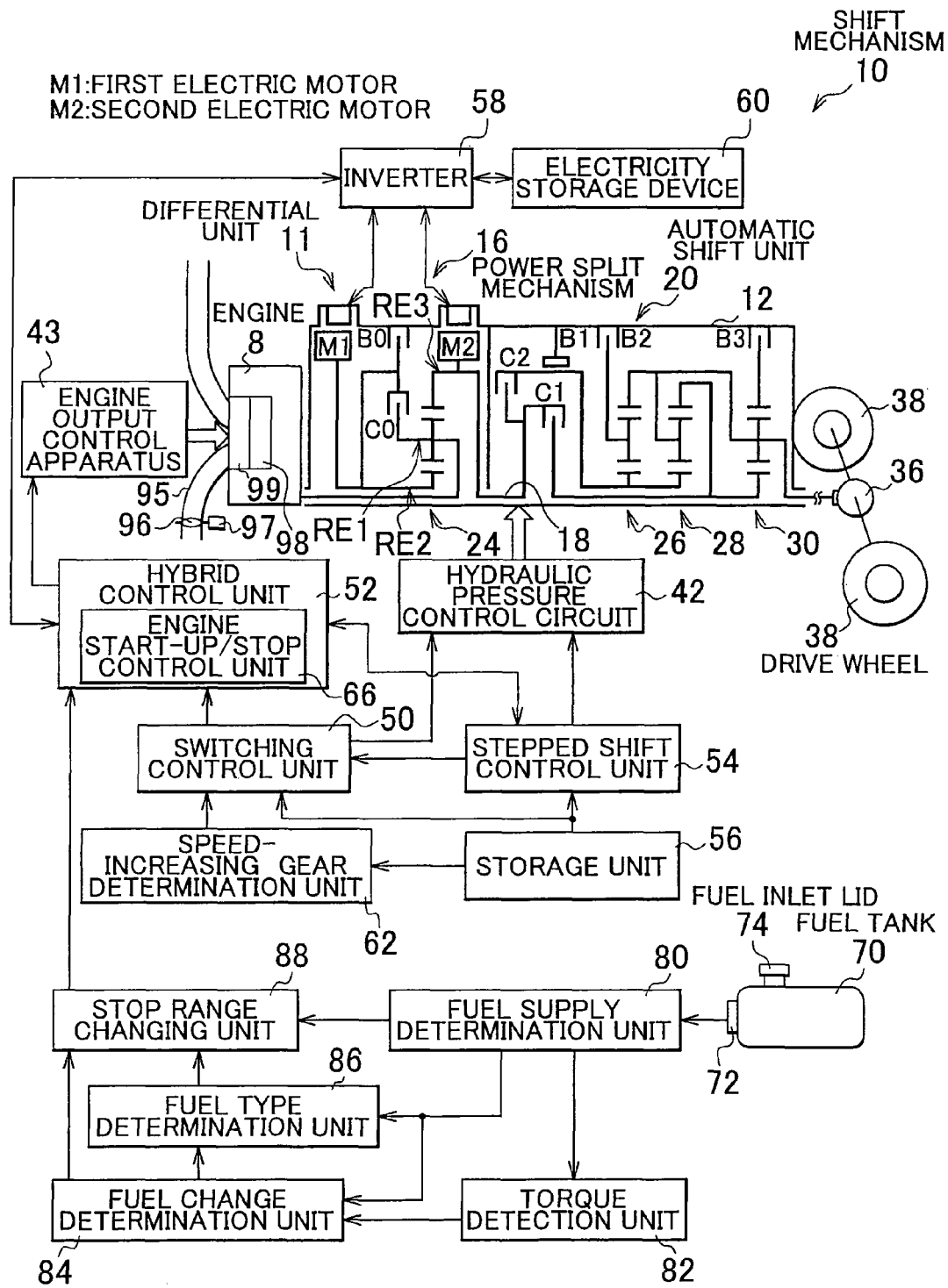
FIG. 6 is a functional block diagram illustrating the main portions of control operations executed by the electronic control unit shown in FIG. 4.

The electronic control unit 40 transmits various control signals to an engine output control apparatus 43 (see FIG. 6) to control the drive power output from the engine 8. These control signals include a drive signal provided to a throttle actuator 97 that controls the opening amount $\theta_{TH}$ of an electronically-controlled throttle valve 96 arranged in an intake pipe 95 of the engine 8, a fuel supply amount signal based on which the amount of fuel supplied into the cylinders of the engine 8 from a fuel injection device 98 is controlled, an ignition signal that indicates the ignition timing at which the air-fuel mixture is ignited by an ignition device 99 in the engine 8, and a boost pressure adjusting signal based on which the boost pressure is adjusted, an electric air-conditioner drive signal based on which an electric air-conditioner is operated, command signals based on which the electric motors M1 and M2 are operated, a shift position (operating position) indication signal based on which a shift range indicator is operated, a gear ratio indication signal based on which the gear ratio is indicated, a snow mode indication signal based on which the fact that the vehicle is being operated in the snow mode is indicated, an ABS activation signal based on which an ABS actuator that prevents the wheels from slipping when brakes are applied is actuated, an M-mode indication signal which indicates that the M-mode has been selected, valve command signals based on which electromagnetically-controlled valves in a hydraulic pressure control circuit 42 (see. FIG. 6) are actuated to control hydraulic actuators for the hydraulic friction application devices in the differential unit 11 and the automatic shift unit 20, a drive command signal based on which an electric oil pump 44 which is a hydraulic pressure source for the hydraulic pressure control circuit 42 is operated, a signal based on which an electric heater is driven, and a signal that is provided to a computer used to execute a cruise control.

Figure 5:
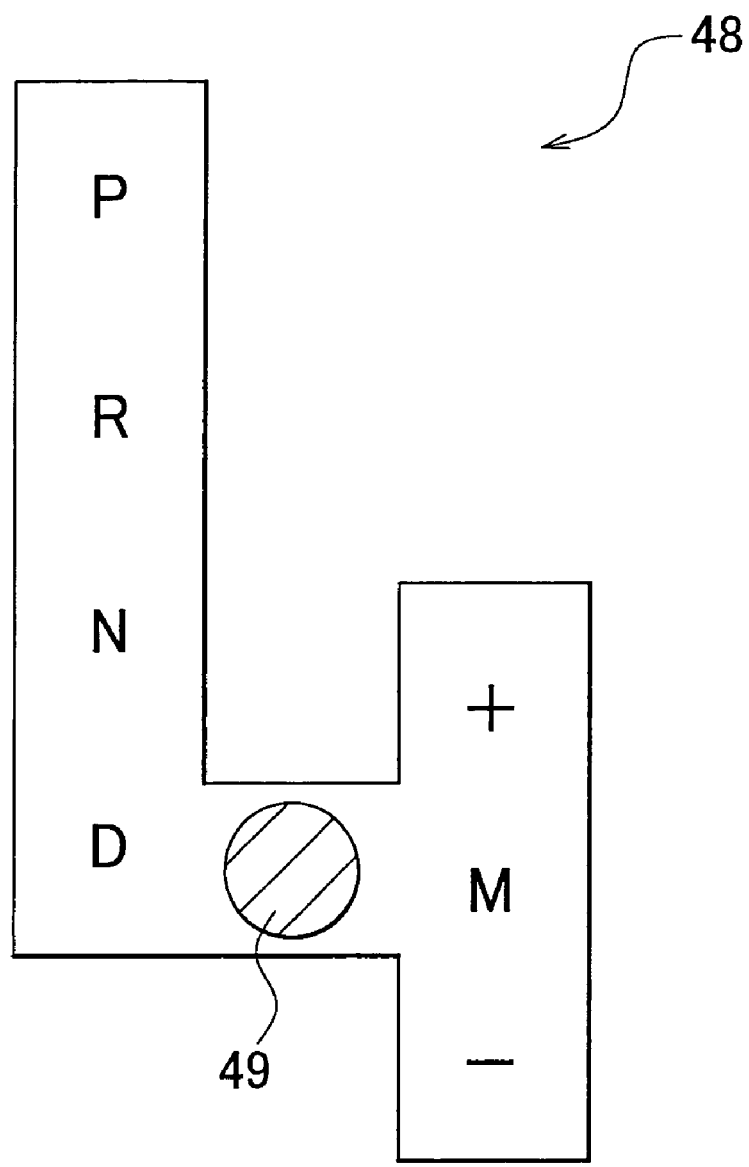
FIG. 5 is a view showing an example of a shift operation device that is operated to select one of multiple shift positions and that is provided with a shift lever.

FIG. 5 shows an example of a shift operation device 48 that serves as a switching device that is used to manually select a shift position from among multiple shift positions $P_{SH}$. This shift operation device 48 is arranged, for example, at the side of the driver's seat, and is provided with a shift lever 49 that is operated to select a desired shift position from among multiple shift positions $P_{SH}$.

The shift lever 49 is manually operated to a desired position from among the following positions. These positions include the park position "Park", the reverse position "Reverse", the neutral position "Neutral", the automatic shifting forward running position "Drive", and manual shifting forward running position "Manual". When the shift lever 49 is in Park, the neutral state, in which the power transmission path in the automatic shift unit 20 of the shift mechanism 10 is interrupted, is achieved, and the output shaft 22 of the automatic shift unit 20 is locked. When the shift lever 49 is in Reverse, the vehicle is allowed to go in reverse. When the shift lever 49 is in Neutral, the shift mechanism 10 in the neutral state in which the power transmission path therein is interrupted. When the shift lever 49 is in Drive, the automatic shift mode, in which the automatic shift control is executed, is achieved. In the automatic shift control, the total gear ratio γT is changed within a certain range. The total gear ratio γT is determined based on the gear ratio of the differential unit 11 and the gear ratio of the automatic shift unit 20 at each gear. The gear ratio of the differential unit 11 is continuously changed in a certain range. The gear of the automatic shift unit 20 is selected from among first gear to fifth gear by the automatic shift control. When the shift lever 49 is in Manual, the manual shift mode (manual mode) is selected to set so-called shift ranges by restricting the use of the high gear(s) of the automatic shift unit 20 that is (are) used in the automatic shift control.

When the shift lever 49 is manually shifted to the selected shift position $P_{SH}$ from among the above-described positions, for example, the state of the hydraulic pressure control circuit 42 is electrically switched to select one of Reverse, Neutral and Drive shown in the operation chart in FIG. 2.

Among the positions Park to Manual, each of the positions Park and Neutral is a non-running position that is selected to stop the vehicle from running. When the shift lever 49 is in Park or Neutral, both of the first clutch C1 and the second clutch C2 are released, as shown in the operation chart in FIG. 2. That is, each of Park and Neutral is a non-drive position. When the shift lever 49 is in Park or Neutral, the power transmission path in the automatic shift unit 20 is placed in the power-transmission interrupted state by releasing the first clutch C1 and the second clutch C2 so that the transmission of the power through the power transmission path is interrupted and therefore the vehicle is not allowed to run. Each of Reverse Drive, and Manual is a running position that is selected to cause the vehicle to run. When the shift lever 49 is in Reverse, Drive, or Manual, at least one of the first clutch C1 and the second clutch C2 is applied as shown in the operation chart in FIG. 2. That is, each of Reverse, Drive and Manual is a drive position. When the shift lever 49 is in Reverse, Drive or Manual, the power transmission path in the automatic shift unit 20 is placed in the power-transmission permitted state by applying the first clutch C1 and/or the second clutch C2 so that the transmission of power through the power transmission path is permitted and the vehicle is allowed to run.

More specifically, when the shift lever 49 is manually shifted from Park or Neutral to Reverse, the state of the power transmission path in the automatic shift unit 20 is switched from the power-transmission interrupted state to the power-transmission permitted state by applying the second clutch C2. When the shift lever 49 is manually shifted from Neutral to Drive, the state of the power transmission path in the automatic shift unit 20 is switched from the power-transmission interrupted state to the power-transmission permitted state by applying at least the first clutch C1. When the shift lever 49 is manually shifted from Reverse to Park or Neutral, the state of the power transmission path in the automatic shift unit 20 is switched from the power-transmission permitted state to the power-transmission interrupted state by releasing the second clutch C2. When the shift lever 49 is manually shifted from Drive to Neutral, the state of the power transmission path in the automatic shift unit 20 is switched from the power-transmission permitted state to the power-transmission interrupted state by releasing the first clutch C1 and the second clutch C2.

FIG. 6 is a functional block diagram illustrating the main part of the control operation executed by the electronic control unit 40. As shown in FIG. 6, a stepped shift control unit 54 functions as a shift control unit that changes gears of the automatic shift unit 20. For example, the stepped shift control unit 54 determines whether the gears of the automatic shift unit 20 should be changed, based on the vehicle condition indicated by the vehicle speed V and the required torque $T_{OUT}$ that should be output from the automatic shift unit 20, using the relationships indicated by solid lines and alternate long and short dash lines (shift diagram, shift map) in FIG. 7 prestored in a storage unit 56. That is, the stepped shift control unit 54 determines the gear to which the automatic shift unit 20 should be shifted, based on the vehicle condition, using the shift diagram. Then, the stepped shift control unit 54 executes an automatic shift control so that the automatic shift unit 20 is shifted to the determined gear. At this time, the stepped shift control unit 54 provides a command to a hydraulic pressure control circuit 42 to apply and/or release the hydraulic frictional application devices other than the switching clutch C0 and the switching brake B0 so that the automatic shift unit 20 is shifted to the determined gear according to, for example, the operation chart in FIG. 2.

When the shift mechanism 10 is in the continuously variable shift mode, that is, when the differential unit 11 is in the differential mode, a hybrid control unit 52 operates the engine 8 efficiently, and controls the gear ratio γ0 of the differential unit 11 that functions as an electric continuously variable transmission, by optimizing the ratio between the drive power supplied from the engine 8 and the drive power supplied from the second electric motor M2, and optimizing the reaction force borne by the first electric motor M1 while the first electric motor M1 generates electricity. For example, the hybrid control unit 52 calculates the target (required) drive power used to drive the vehicle based on the accelerator-pedal operation amount Acc, which indicates the amount of output required by the driver, and the vehicle speed V; calculates the total target drive power based on the target drive power used to drive the vehicle and the required value for charging an electricity storage device; calculates the target drive power output from the engine so that the total target drive power is output from the engine, taking into account a transfer loss, loads placed on auxiliary machines, an assist torque supplied from the second electric motor M2, and the like; and controls the engine speed $N_E$ and the engine torque $T_E$ of the engine 8 to obtain the target drive power, and controls the amount of electricity generated by the first electric motor M1.

The hybrid control unit 52 executes the hybrid control to improve the power performance, the fuel efficiency, and the like, taking into account the gear of the automatic shift unit 20. During this hybrid control, the differential unit 11 functions as an electric continuously variable transmission to coordinate the engine speed $N_E$ and the vehicle speed V, which are set to operate the engine 8 efficiently, and the rotational speed of the transmitting member 18, which is set by the gear of the automatic shift unit 20. That is, the hybrid control unit 52 sets the target value of the total gear ratio γT of the shift mechanism 10 so that the engine 8 operates according to the optimum fuel efficiency curve (fuel efficiency map, relational diagram). The optimum fuel efficiency curve is empirically determined in advance in a two-dimension coordinate that uses the engine speed $N_E$ and the torque $T_E$ output from the engine 8 (engine torque $T_E$) as parameters so that high drivability and high fuel efficiency are achieved when the vehicle is driven in the continuously variable shift mode. The optimum fuel efficiency curve is stored in the hybrid control unit 52. For example, the hybrid control unit 52 sets the target value of the total gear ratio γT of the shift mechanism 10 so that the engine torque $T_E$ and the engine speed $N_E$, at which the drive power output from the engine matches the target drive power (the total target drive power, or the required drive power), are achieved. Then, the hybrid control unit 52 controls the gear ratio γ0 of the differential unit 11 so that the target drive power is obtained, thereby controlling the total gear ratio γT within a range, for example, from 0.5 to 13, in which the total gear ratio γT is allowed to be changed.

At this time, the hybrid control unit 52 supplies the electric energy generated by the first electric motor M1 to an electricity storage device 60 and the second electric motor M2 through an inverter 58. Therefore, although a large part of the drive power output from the engine 8 is mechanically transmitted to the transmitting member 18, the other part of the drive power output from the engine 8 is consumed by the first electric motor M1 to generate electricity. That is, the other part of the drive power output from the engine 8 is converted into electric energy in the first electric motor M1. The electric energy is supplied to the second electric motor M2 through the inverter 58, and the second electric motor M2 is driven. Thus, mechanical energy is transmitted from the second electric motor. M2 to the transmitting member 18. The devices related to the process from generation of the electricity to consumption of the electricity in the second electric motor M2 constitute an electric path in which part of the power output from the engine 8 is converted into the electric energy, and the electric energy is converted to the mechanical energy.

Also, the hybrid control unit 52 has a function as an engine output control unit that executes an output control over the engine 8 so that the engine 8 generates the required amount of drive power, by outputting at least one of an instruction for controlling opening/closing of the electronically-controlled throttle valve 96 using the throttle actuator 97, an instruction for controlling the amount of fuel injected by the fuel injection device 98, and timing at which the fuel is injected by the fuel injection device 98 and an instruction for controlling timing at which the air-fuel mixture is ignited by the ignition device 99 such as an igniter, to the engine output control apparatus 43. For example, the hybrid control unit 52 basically executes a throttle control to drive the throttle actuator 97 based on the accelerator-pedal operation amount Acc according to a prestored relational diagram (not shown). That is, the hybrid control unit 52 basically executes the throttle control to increase the throttle-valve opening amount $\theta_{TH}$ as the accelerator-pedal operation amount Acc increases.

Figure 7:
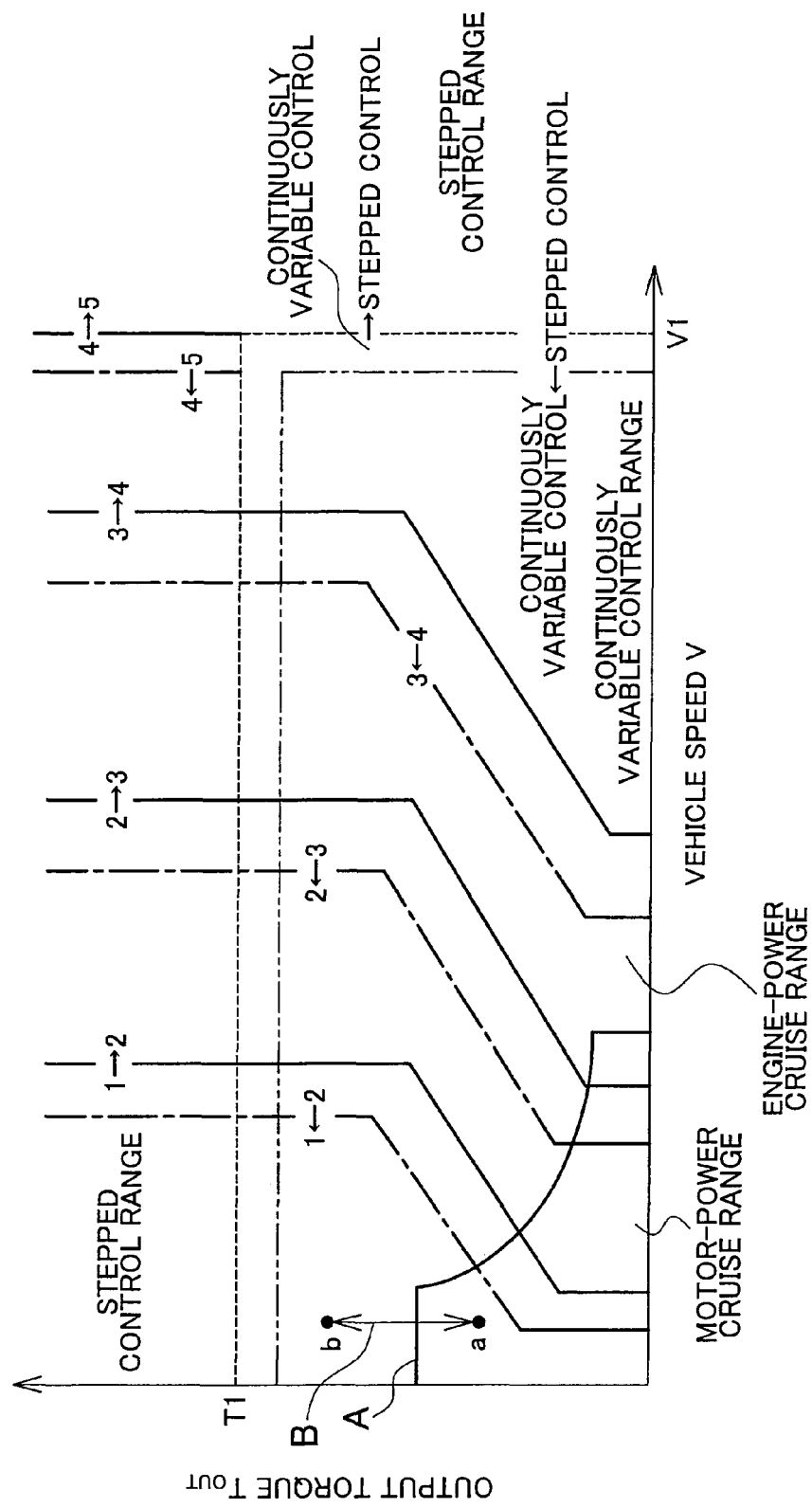
FIG. 7 is a graph showing examples of a shift diagram which is stored in advance and used to determine whether gears of an automatic shift unit should be changed, a switching diagram which is stored in advance and used to determine whether the shift mode of a shift mechanism should be changed, and a drive power source switching diagram which is stored in advance, which includes a boundary between an engine-power cruise range and a motor-power cruise range, and which is used to determine whether the drive power source should be changed, all of the diagrams being formed on the same two-dimensional coordinate system that uses the vehicle speed and the output torque as parameters, and FIG. 7 also showing the relationship among the shift diagram, the switching diagram and the drive power source switching diagram.

The solid line A in FIG. 7 is the boundary between the engine-power cruise range and the motor-power cruise range. The boundary is used to determine whether the drive power source, which generates the drive power used to start up and drive the vehicle, should be changed between the engine 8 and a motor, for example, the second electric motor M2. In other words, the boundary is used to determine whether the cruise mode should be changed between so-called engine-power cruise mode in which the vehicle is started up and driven using the engine 8 as a drive power source, and so-called motor-power cruise mode in which the vehicle is driven using the second electric motor M2 as a drive power source. The pre-stored relational diagram, shown in FIG. 7, which includes the boundary (indicated by the solid line A) used to determine whether the cruise mode should be changed between the engine-power cruise mode and the motor-power cruise mode, is an example of a drive power source switching diagram (drive power source map) that is formed of a two-dimensional coordinate system that uses the vehicle speed V and the output torque $T_{OUT}$ which is a value related to drive power as parameters. This drive power source switching diagram is prestored along with, for example, the shift diagram (shift map) indicated by the solid lines and the alternate long and short dash lines in FIG. 7 in the storage unit 56.

For example, the hybrid control unit 52 determines whether the vehicle condition indicated by the vehicle speed V and the required torque $T_{OUT}$ is within the motor-power cruise range or the engine-power cruise range using the drive power source switching diagram shown in FIG. 7. Then, the hybrid control unit 52 drives the vehicle in the motor-power cruise mode or the engine-power cruise mode. As evident from FIG. 7, for example, the hybrid control unit 52 drives the vehicle in the motor-power cruise mode in a low output torque $T_{OUT}$ range, that is, in a low engine torque $T_E$ range where the engine efficiency is generally lower than that in a high torque range, or in a low vehicle speed range where the vehicle speed V is relatively low; that is, a low load range.

When the vehicle is driven in the motor-power cruise mode, the hybrid control unit 52 executes the control to suppress drag of the engine 8 that is stopped, and to improve fuel efficiency. That is, when the vehicle is driven in the motor-power cruise mode, the hybrid control unit 52 controls the first motor M1 so that the first electric motor rotational speed $N_{M1}$ is a negative value, for example, the first motor M1 is idling, using the electric CVT function (differential action) of the differential portion 11, thereby maintaining the engine speed $N_E$ at zero or substantially zero using the differential action of the differential portion 11.

The hybrid control unit 52 changes the operating state of the engine 8 between the operation state and the stopped state in order to change the cruise mode between the engine-power cruise mode and the motor-power cruise mode. That is, the hybrid control unit 52 includes an engine start-up/stop control unit 66 that starts or stops the engine 8. The engine start-up/stop control unit 66 starts up or stops the engine 8, when the hybrid control unit 52 determines that the cruise mode should be changed between the motor-power cruise mode and the engine-power cruise mode based on the vehicle state according to, for example, the drive power source switching diagram in FIG. 7.

For example, as indicated by the movement from a point "a" to a point "b" on the solid line B in FIG. 7, when the required output torque $T_{OUT}$ is increased due to depression of the accelerator pedal and the vehicle state is switched from the motor-power cruise range to the engine-power cruise range, the engine start-up/stop control unit 66 supplies electric power to the first electric motor M1 to increase the first electric motor rotational speed $N_{M1}$, that is, to cause the first electric motor M1 to function as a starter. Thus, the engine speed $N_E$ is increased, and the engine 8 is started up in such a manner that the air-fuel mixture is ignited by the ignition device 99 at a predetermined engine speed $N_E'$, for example, the engine speed $N_E$ at which a self-sustained operation of the engine 8 is available. Thus, the hybrid control unit 52 switches the cruise mode from the motor-power cruise mode to the engine-power cruise mode. In this case, the engine start-up/stop control unit 66 may promptly increase, the engine speed $N_E$ to the predetermined engine-speed $N_E'$ by promptly increasing the first electric motor rotational speed $N_{M1}$. Thus, it is possible to promptly avoid a resonance range in the engine speed range of which the upper limit is an idle speed $N_{EIDL}$, thereby suppressing occurrence of resonance when the engine is started up. When operating properly, the second electric motor M2 is allowed to rotate in only one direction, whereas the first electric motor M1 is allowed to rotate in the forward direction and the reverse direction. Therefore, the rotational direction of the first electric motor M1 that is the same as the rotational direction of the second electric motor M2 is regarded as the forward rotational direction of the first electric motor M1. When the rotational speed $N_{M1}$ of the first electric motor M1 becomes closer to zero while the first electric motor M1 is rotating in the reverse direction, the value of the rotational speed increases if the rotational direction (whether the rotational speed is a positive value or a negative value) is taken into account. Therefore, the first electric motor rotational speed $N_{M1}$ is increased.

As indicated by the movement from the point "b" to the point "a" on the solid line B in FIG. 7, when the required output torque $T_{OUT}$ is decreased due to release of the accelerator pedal and the vehicle state is switched from the engine-power cruise range to the motor-power cruise range, the engine start-up/stop control unit 66 stops fuel supply from the fuel injection device 98, that is, cuts off fuel supply, to stop the engine 8. Thus, the hybrid control unit 52 switches the cruise mode from the engine-power cruise mode to the motor-power cruise mode. In this case, the engine start-up/stop control unit 66 may promptly decrease the engine speed $N_E$ to zero or a value substantially equal to zero by promptly decreasing the first electric motor rotational speed $N_{M1}$. Thus, it is possible to promptly avoid the resonance range, thereby suppressing occurrence of vibration when the engine is started up. Alternatively, the engine start-up/stop control unit 66 may decrease the engine speed $N_E$ by decreasing the first electric motor rotational speed $N_{M1}$ before fuel supply is cut off. Thus, the fuel supply is cut off in order to stop the engine 8, when the engine speed $N_E$ is the predetermined engine speed $N_E'$.

Even when the vehicle is driven in the engine-power cruise mode, the hybrid control unit 52 can perform a so-called torque-assist operation to assist the engine 8, by supplying electric energy to the second electric motor M2 from the first electric motor M1 via the electric path, and/or from the electricity storage device 60, and by driving the second electric motor M2. Therefore, in the embodiment of the invention, the cruise mode in which the both the engine 8 and the second electric motor M2 are used as the drive power sources for the vehicle is included not in the motor-power cruise mode but in the engine-power cruise mode.

Also, the hybrid control unit 52 maintains the operating state of the engine 8 using the electric CVT function of the differential unit 11, even when the vehicle is stopped or running at a low speed. For example, if the state-of-charge (SOC) of the electricity storage device 60 is reduced and electricity needs to be generated by the first electric motor M1 when the vehicle is at a standstill, the first electric motor M1 is driven by the engine 8 to generate electricity and the rotational speed of the first electric motor M1 is increased. Therefore, even if the second electric motor rotational speed $N_{M2}$ which is determined by the vehicle speed V becomes zero (or a value substantially equal to zero) because the vehicle is at a standstill, the engine speed $N_E$ is maintained at or above the engine speed at which self-sustainable operation of the engine 8 is available, by using the differential operation of the power split mechanism 16.

The hybrid control unit 52 can maintain the engine speed $N_E$ at any given value by using the electric CVT function of the differential portion 11, and by controlling the first electric motor rotational speed $N_{M1}$ and/or the second electric motor rotational speed $N_{M2}$, regardless of whether the vehicle is at a standstill or traveling. For example, as can be seen from the collinear diagram in FIG. 3, when the engine speed $N_E$ is increased, the hybrid control unit 52 increases the first electric motor rotational speed $N_{M1}$ while maintaining the second electric motor rotational speed $N_{M2}$ that depends on the vehicle speed V.

A speed-increasing gear determination unit 62 determines whether the gear into which the shift mechanism 10 should be shifted is a speed-increasing gear, for example, fifth gear, according to the shift diagram shown in FIG. 7 prestored in the storage unit 56, based on, for example, the vehicle condition in order to determine which of the switching clutch C0 and the switching brake B0 should be applied when placing the shift mechanism 10 in the stepped shift mode.

A switching control unit 50 selectively switches the shift mode between the continuously variable shift mode, i.e., the differential mode, and the stepped shift mode, i.e., the locked mode, by switching the application/release state of the differential mode switching devices (C0, B0) based on the vehicle condition. For example, the switching control unit 50 determines whether to switch the shift mode of the shift mechanism 10 (differential unit 11) based on the vehicle condition indicated by the required output torque $T_{OUT}$ and the vehicle speed V using the relationship (shift diagram, shift map) indicated by the broken line and the double-chain dash line in FIG. 7, which is prestored in the storage unit 56. That is, the switching control unit 50 determines the shift mode into which the shift mechanism 10 should be shifted by determining whether the vehicle condition is within the continuously variable control range in which the shift mechanism 10 should be placed in the continuously variable shift mode, or in the stepped control range in which the shift mechanism 10 should be placed in the stepped shift mode. Then, the switching control unit 50 switches the shift mode to place the shift mechanism 10 into either the continuously variable shift mode or the stepped shift mode based on the result of determination.

More specifically, if it is determined that the vehicle condition is within the stepped control range, the switching control unit 50 transmits a signal, based on which the hybrid control or the continuously variable transmission control is not permitted, i.e. prohibited, to the hybrid control unit 52. At the same time, the switching control unit 50 transmits a signal, based on which gears of the automatic shift unit 20 are allowed to be changed, to the stepped shift control unit 54. Then, the stepped shift control unit 54 executes the automatic shift control over the automatic shift unit 20 according to, for example, the shift diagram shown in FIG. 7 that is prestored in the storage unit 56. For example, the operation chart in FIG. 2 that is prestored in the storage unit 56 shows the combinations of the hydraulic friction application devices, i.e., C0, C1, C2, B0, B1, B2, and. B3, that are selectively applied to change the gears of the automatic shift unit 20. That is, the entire shift mechanism 10, i.e., the differential unit 11 and the automatic shift unit 20, functions as a so-called stepped automatic transmission, and is shifted to the selected gear according to the operation chart shown in FIG. 2.

For example, when the speed-increasing gear determination unit 62 determines that the shift mechanism 10 should be shifted to fifth gear, a speed-increasing gear, i.e., a so-called overdrive gear, that has a gear ratio of lower than 1.0 should be selected by the entire shift mechanism 10. Therefore, the switching control unit 50 transmits a command to the hydraulic pressure control circuit 42 to release the switching clutch C0 and apply the switching brake B0 so that the differential unit 11 functions as an auxiliary transmission that has a fixed gear ratio γ0 of, for example, 0.7. On the other hand, when the speed-increasing gear determination unit 62 determines that the shift mechanism 10 should be shifted to a gear other than fifth gear, a speed-decreasing gear or a speed-maintaining gear that has a gear ratio of equal to or higher than 1.0 should be selected by the entire shift mechanism 10. Therefore, the switching control unit 50 transmits a command to the hydraulic pressure control circuit 42 to apply the switching clutch C0 and release the switching brake B0 so that the differential unit 11 functions as an auxiliary transmission that has a fixed gear ratio γ0 of, for example, 1. In this way, the switching control unit 50 places the shift mechanism 10 in the stepped shift mode, and changes the operating states of the switching clutch C0 and the switching brake B0 so that the speed-increasing gear or the speed-decreasing gear (speed-maintaining gear) in that stepped shift mode is selected. Thus, the differential unit 11 functions as an auxiliary transmission. In addition, the automatic shift unit 20 that is connected in tandem with the differential unit 11 functions as a stepped transmission. As a result, the entire shift mechanism 10 functions as a so-called stepped automatic transmission.

However, if it is determined that the vehicle condition is within the continuously variable transmission control range in which the shift mechanism 10 should be shifted to the continuously variable shift mode, the switching control unit 50 transmits a command to the hydraulic pressure control circuit 42 to release both the switching clutch C0 and the switching brake B0. If both the switching clutch C0 and the switching brake B0 are released, the differential unit 11 is shifted to the continuously variable shift mode and the entire shift mechanism 10 is shifted to the continuously variable shift mode. At the same time, the switching control unit 50 transmits a signal to the hybrid control unit 52 to allow the hybrid control unit 52 to execute the hybrid control. Also, the switching control unit 50 provides the stepped shift control unit 54 with a signal to fix the gear at the predetermined gear for the continuously variable shift mode, or a signal to allow the stepped shift control unit 54 to automatically change the gears of the automatic shift unit 20 according to, for example, the shift diagram shown in FIG. 7 which is prestored in the storage unit 56. In this case, the stepped shift control unit 54 executes the automatic shift control by applying or releasing the clutches and the brakes other than the switching clutch C0 and the switching brake B0 according to the operation chart shown in FIG. 2. When the differential unit 11 that is shifted to the continuously variable shift mode by the switching control unit 50 functions as a continuously variable transmission and the automatic shift unit 20 that is arranged in tandem with the differential unit 11 functions as a stepped transmission, an appropriate amount of drive power is obtained. In addition, the rotational speed that is input to the automatic shift unit 20, which is at one of first gear, second gear, third gear, and fourth gear, is continuously changed so that gear ratio of each gear is allowed to change continuously. Accordingly, the gears are changed while the gear ratio is continuously changed. As a result, the total gear ratio γT which is achieved by the entire shift mechanism 10 is continuously changed.

FIG. 7 will be described in detail below. FIG. 7 shows the relational diagram (shift diagram, shift map) which is prestored in the storage unit 56 and based on which whether the gears of the automatic shift unit 20 should be changed is determined. This shift diagram is formed of a two-dimensional coordinate system that uses the vehicle speed V and the required output torque $T_{OUT}$, which is a value related to the drive power, as parameters. The solid lines in FIG. 7 are upshift lines and the alternate long and short dash lines are downshift lines.

The broken line in FIG. 7 represents the reference vehicle speed V1 and the reference output torque T1 used by the switching control unit 50 to determine whether the vehicle condition is within the continuously variable control range or the stepped control range. That is, the broke line in FIG. 7 includes both a high vehicle speed determination line and a high output determination line. The high vehicle speed determination line indicates the reference vehicle speed V1 which is a predetermined value that is used to determine whether the vehicle is traveling at a high vehicle speed. The high output determination line indicates the reference output torque T1 which is a predetermined value that is used to determine whether the value related to the drive power required by the hybrid vehicle is high, for example, whether the output torque $T_{OUT}$ from the automatic shift unit 20 should be high. Moreover, there is provided a hysteresis range indicated by the alternate long and two short dash line and the broken line in FIG. 7. The hysteresis range is between the stepped control range and the continuously variable control range. Therefore, the hysteresis effect is produced in the determination as to whether the vehicle condition is within the stepped control range or the continuously variable control range. That is, FIG. 7 shows a prestored switching diagram (switching map, relational diagram), which includes the reference vehicle speed V1 and the reference output torque T1, which uses the vehicle speed V and the output torque $T_{OUT}$ as parameters, and which is used when the switching control unit 50 determines whether the vehicle condition is within the stepped control range or the continuously variable control range. A shift map that includes this switching diagram may be prestored in the storage unit 56. The switching diagram may include at least one of the reference vehicle speed V1 and the reference output torque T1, or may include a prestored switching line that uses the vehicle speed V or the output torque $T_{OUT}$ as a parameter.

The above-described shift diagram, switching diagram, drive power source switching diagram or the like may be stored in the form of a determination expression for comparing the actual vehicle speed V with the reference vehicle speed V1 and a determination expression for comparing the output torque $T_{OUT}$ with the reference output torque T1 instead of in the form of a map. In this case, the switching control unit 50 places the shift mechanism 10 in the stepped shift mode, for example, when the actual vehicle speed V (value indicating the vehicle condition) has exceeded the reference vehicle speed V1. Also, the switching control unit 50 places the shift mechanism 10 in the stepped shift mode when the output torque $T_{OUT}$ (value indicating the vehicle condition) that should be output from the automatic shift unit 20 has exceeded the reference output torque T1.

There may be a failure or a decrease in function of electric control equipment, for example, an electric motor, which is used to have the differential unit 11 function as an electric continuously variable transmission. For example, there may be a decrease in the function of equipment related to the electrical path from generation of electrical energy in the first electric motor M1 to conversion of the electricity into mechanical energy. That is, there may be a failure in the first electric motor M1, the second electric motor M2, the inverter 58, the electricity storage device 60, or the transmission path that connects these devices with each other. Also, the function of the vehicle may be decreased due to a failure or low temperature. In these cases, even if the vehicle condition is within the continuously variable control range, the switching control unit 50 may preferentially place the shift mechanism 10 in the stepped shift mode in order to reliably keep the vehicle running.

The value related to the drive power described above is a parameter that corresponds one-to-one with the drive power required by the vehicle. This value is not limited to the drive torque or drive power required by the drive wheels 38, but may also be the actual value of, for example, the output torque $T_{OUT}$ from the automatic shift unit 20, the vehicle acceleration, or the engine torque $T_E$ that is calculated based on the accelerator pedal operation amount or the throttle valve opening amount $\theta_{TH}$ (or the intake air amount, the air-fuel ratio, or the fuel injection quantity) and the engine speed $N_E$, or an estimated value of, for example, the required drive power, the required (target) output torque $T_{OUT}$ from the automatic shift unit 20, or the required (target) engine torque $T_E$ that is calculated based on, for example, the accelerator pedal operation amount achieved by the driver or the throttle opening amount. The drive torque may be calculated based on, for example, the output torque $T_{OUT}$ with the differential ratio, the radius of the drive wheels 38, etc. taken into account, or may be directly detected using, for example, a torque sensor. The other values may also be calculated or detected in this way.

If the shift mechanism 10 is placed in the continuously variable shift mode when the vehicle is traveling at a high vehicle speed, the fuel efficiency is decreased. In order to avoid such a situation, the reference vehicle speed V1 is set. If the vehicle speed is higher than the reference vehicle speed V1, the shift mechanism 10 is placed in the stepped shift mode. The reference output torque T1 is set based on, for example, the characteristics of the first electric motor M1, which are exhibited when the maximum value of the electric energy is appropriately decreased. In this way, when a large amount of drive power is required to drive the vehicle, a reaction torque from the first electric motor M1 is not required for an engine torque within a high torque range. As a result, the size of the first electric motor M1 is reduced.

Figure 8:
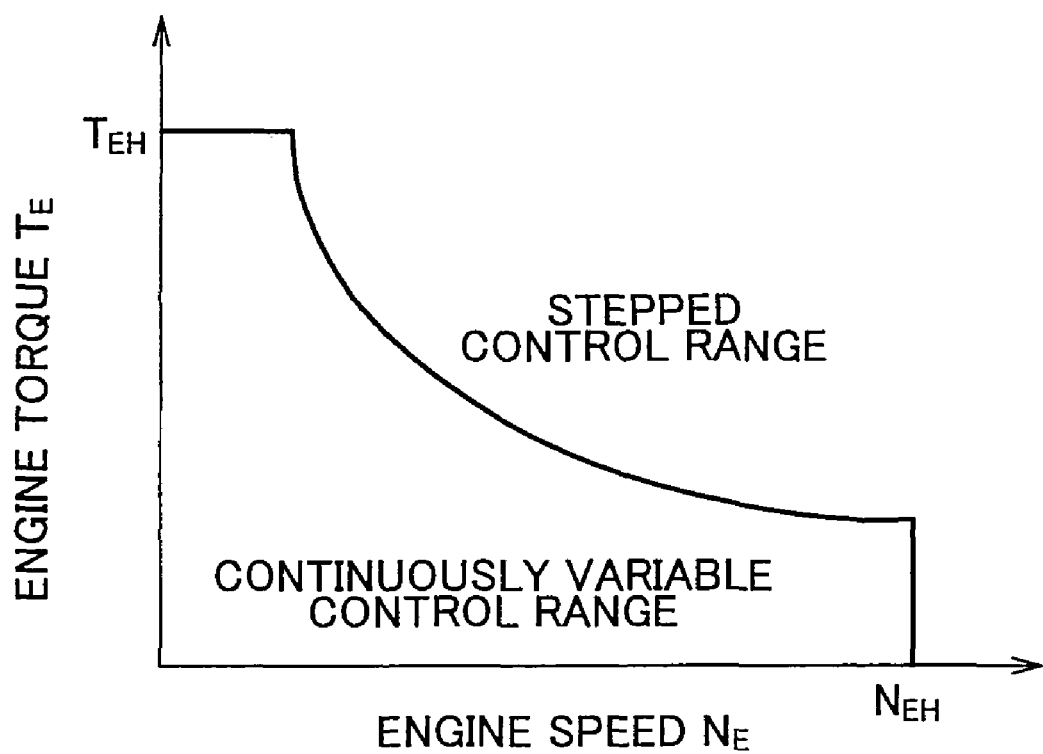
FIG. 8 is a graph showing a pre-stored relational diagram having a boundary between a continuously variable control range and a stepped control range, and FIG. 8 also being a conceptual diagram for mapping out the boundary between the continuously variable control range and the stepped control range shown by the broken line in FIG. 7.

FIG. 8 is a switching diagram (switching map, relational diagram) that is prestored in the storage unit 56. The switching map uses the engine speed $N_E$ and the engine torque $T_E$ as parameters, and includes an engine output line that is a boundary which is used when the switching control unit 50 determines whether the vehicle condition is within the stepped control range or the continuously variable control range. The switching control unit 50 may determine, based on the engine speed $N_E$ and the engine torque $T_E$, according to the switching diagram in FIG. 8 instead of the switching diagram in FIG. 7, whether the vehicle condition indicated by the engine speed $N_E$ and the engine torque $T_E$ is within the continuously variable control range or the stepped control range. FIG. 8 is also a schematic diagram used to form the broken line in FIG. 7. In other words, the broken line in FIG. 7 is a switching line that is formed on the two-dimensional coordinate system that uses the vehicle speed V and the output torque $T_{OUT}$ as parameters, based on the relational diagram (map) in FIG. 8.

As shown in FIG. 7, the high torque range in which the output torque $T_{OUT}$ is equal to or higher than the predetermined reference output torque T1, and the high vehicle speed range in which the vehicle speed V is equal to or higher than the predetermined reference vehicle speed V1, are used as the stepped control range. Therefore, the shift mechanism 10 is placed in the stepped shift mode when the torque from the engine 8 is relatively high and when the vehicle speed is relatively high. On the other hand, when the torque from the engine 8 is relatively low and when the vehicle speed is relatively low, namely, when the engine 8 is required to produce a drive power within a regular drive power range, the shift mechanism 10 is placed in the continuously variable shift mode.

Similarly, as shown in FIG. 8, the high torque range in which the engine torque $T_E$ is equal to or higher than a predetermined reference value $T_{EH}$, a high speed range in which the engine speed $N_E$ is equal to or higher than a predetermined reference value $N_{EH}$, and a high drive power range in which the drive power output from the engine, which is calculated based on the engine torque $T_E$ and the engine speed $N_E$, is equal to or greater than a predetermined reference value are used as the stepped control range. Therefore, the shift mechanism 10 is placed in the stepped shift mode when the torque output from the engine 8 is relatively high, when the speed of the engine 8 is relatively high, and when the drive power output from the engine 8 is relatively large. On the other hand, when the torque output from the engine 8 is relatively low, when the speed of the engine 8 is relatively low, and when the drive power output from the engine 8 is relatively small, namely, when the engine 8 is required to produce a drive power within the regular drive power range, the shift mechanism 10 is placed in the continuously variable shift mode. The boundary between the stepped control range and the continuously variable control range in FIG. 8 corresponds to the high vehicle speed reference line that indicates the values used to determine whether the vehicle is traveling at a high speed and the high output reference line used to determine whether a high engine torque is required to be output.

Accordingly, for example, when the vehicle is running at a low or medium speed and when a small or medium amount of drive power is required to drive the vehicle, the shift mechanism 10 is placed in the continuously variable shift mode to maintain favorable fuel efficiency. However, when the vehicle is running at a high speed, for example, when the actual vehicle speed V is higher than the reference vehicle speed V1, the shift mechanism 10 is placed in the stepped shift mode in which it operates as a stepped transmission. In this case, the drive power output from the engine 8 is transmitted to the drive wheels, 38 along the mechanical power transmission path. Therefore, it is possible to suppress loss due to conversion between drive power and electric energy, which occurs when the shift mechanism 10 operates as an electric continuously variable transmission. As a result, the fuel efficiency is improved. When a large amount of drive power is required to drive the vehicle, for example, when the value related to the drive power, for example, the output torque $T_{OUT}$, exceeds the reference output torque T1, the shift mechanism 10 is placed in the stepped shift mode in which it operates as a stepped transmission. In this case, the drive power output from the engine 8 is transmitted to the drive wheels 38 along the mechanical power transmission path. Therefore, the shift mechanism 10 is operated as an electric continuously variable transmission only when the vehicle is traveling at a low or medium speed and when a small or medium amount of drive power is required to drive the vehicle. Accordingly, it is possible to decrease the maximum value of the electricity that should be generated by the first electric motor M1, that is, the maximum value of the electricity that should be supplied from the first electric motor M1. As a result, it is possible to further reduce the size of the first electric motor M1 or the vehicle power transmission system that includes that first electric motor M1. From another perspective, when a large amount of drive power is required to drive the vehicle, more emphasis is placed on the requirement for the drive power made by the driver than the requirement for the fuel efficiency. Accordingly, the shift mode is switched from the continuously variable shift mode to the stepped shift mode (fixed shift mode). Thus, the user can enjoy a change in the engine speed $N_E$ due to upshift that is caused when the vehicle is traveling in the stepped automatic shift mode, that is, a delightful change in the engine speed $N_E$ due to gear-shift.

As described above, the differential unit 11 (shift mechanism 10) according to the embodiment of the invention is selectively switched between the continuously variable shift mode and the stepped shift mode (fixed shift mode). The switching control unit 50 determines the shift mode in which the differential unit 11 should be placed based on the vehicle state, and the differential unit 11 is placed in one of the continuously variable shift mode and the stepped shift mode. In the embodiment of the invention, the hybrid control unit 52 selects the motor-power cruise mode or the engine-power cruise mode based on the vehicle state. In order to change the cruise mode between the engine-power cruise mode and the motor-power cruise mode, the engine start-up/stop control unit 66 starts up or stops the engine 8.

Basically, gasoline is used as the fuel in the engine 8. However, ethanol and gasoline fuel may be blended with each other at a predetermined blend ratio. In this case, variation of characteristics such as volatilities of these fuels may exert unfavorable effects on the start-up performance of the engine 8. In order to alleviate the unfavorable effects of the fluctuations of the start-up performance of the engine 8 on a smooth motion of the vehicle, for example, an engine speed acceleration $A_E$, which is a rate of increase in the engine speed $N_E$ per unit time when the engine speed $N_E$ is increased to start up the engine, needs to be increased to increase the engine speed $N_E$ more promptly as the start-up performance of the engine 8 deteriorates. In order to increase the engine speed acceleration $A_E$, it is advantageous to obtain higher torque, which can be used to increase the engine speed $N_E$, from the first electric motor M1 and the second electric motor M2. However, the rated torque that is the maximum torque which can be output from an electric motor is lower as the rotational speed of the electric motor is higher. Therefore, when the start-up performance of the engine 8 deteriorates, the first electric motor rotational speed NM1 and the second electric motor rotational speed NM2 are decreased to increase the rated torque of the first electric motor M1 and the rated torque of the second electric motor M2 when the engine starts up, or the torques that are produced by the first electric motor M1 and the second electric motor M2 and that are used for purposes other than engine start-up, for example, traveling of the vehicle, are decreased to relatively increase the torque that can be used to start up the engine. In this way, it is considered to be possible to alleviate the unfavorable effects of deterioration of the start-up performance of the engine on a smooth motion of the vehicle.

When the start-up performance of the engine 8 deteriorates because ethanol is blended with the fuel in the engine 8, control for alleviating the unfavorable effects of deterioration of the start-up performance of the engine 8 on a smooth motion of the hybrid vehicle is executed in consideration of the relationship between the engine start-up performance and the torques that are produced by the first electric motor M1 and the second electric motor M2 and that are used to start up the engine. Hereafter, this control will be described in detail.

Referring again to FIG. 6, a fuel supply determination unit 80 determines whether the amount of fuel in a fuel tank 70 of the hybrid vehicle has been increased. This is because, only when the amount of fuel in the fuel tank 70 is increased, the blend ratio of ethanol to the entire fuel is changed to change the fuel characteristic. More specifically, whether the amount of fuel in the fuel tank 70 has been increased is determined based on a signal from a fuel gauge 72 that detects the amount of fuel in the fuel tank 70. When the fuel is supplied to the fuel tank 70, a fuel inlet lid 74, which is used to close a fuel inlet of the fuel tank 70, is opened. Therefore, the fuel supply determination unit 80 may determine that the amount of fuel in the fuel tank 70 has been increased when the fuel inlet lid 74 is opened.

The transmitting member 18, the first electric motor M1 and the engine 8 are connected to each other via the differential planetary gear unit 24. Therefore, when the shift mechanism 10 in the engine-power cruise mode is in the continuously variable shift mode, a reaction torque that counters the engine torque $T_E$ is output from the first electric motor M1 so that the transmitting member 18 is rotated at a predetermined rotational speed. Accordingly, if the reaction torque is determined, the engine torque $T_E$ is also determined. Therefore, a torque detection unit 82 detects the engine torque $T_E$ based on the reaction torque that is output from the first electric motor M1. More specifically, the torque detection unit 82 detects an output torque $T_{M1}$ from the first electric motor M1 (hereinafter, referred to as "first electric motor torque $T_{M1}$"), which is the reaction torque, based on a value of an electric current that is supplied to the first electric motor M1, which is determined based on a control amount that is provided to the inverter 58. Then, the torque detection unit 82 calculates the engine torque $T_E$ based on the first electric motor torque $T_{M1}$, the gear ratio $\rho 0$, etc. For example, when the engine torque $T_E$ and the first electric motor torque $T_{M1}$ are not zero and kept in balance, that is, when the vehicle is in the steady cruise mode, the engine torque $T_E$ is calculated by Equation 1. There is a minus sign in the right side of Equation 1 because the direction of the first electric motor torque $T_{M1}$ is opposite to the direction of the engine torque $T_E$.

$$T_E = -T_{M1} \times (1+\rho 0)/\rho 0 \qquad \text{Equation 1}$$

Figure 9:
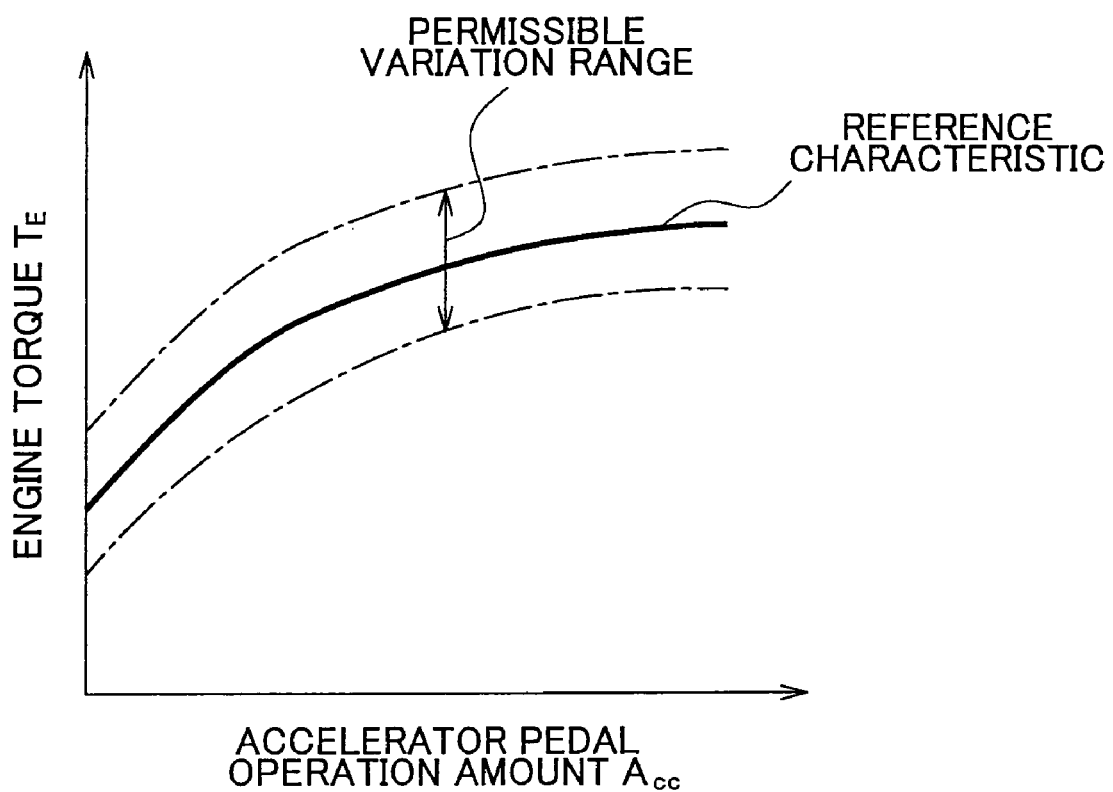
FIG. 9 is a graph showing the relationship between an engine torque and an accelerator pedal operation amount when gasoline is used as the fuel that is supplied to an engine.

FIG. 9 is a graph showing the relationship between the engine torque $T_E$ and the accelerator pedal operation amount Acc when gasoline is used as the fuel. The shift mechanism 10 is designed in consideration of the fact that the point indicating the relationship between the engine torque $T_E$ and the accelerator pedal operation amount Acc may change within a permissible variation range in FIG. 9, which is set based on the reference characteristic indicated by a thick sold line in FIG. 9. When the characteristic of fuel is changed, for example, when ethanol is blended with the gasoline that is supplied to the engine 8, the point indicating the relationship between the engine torque $T_E$ and the accelerator pedal operation amount Acc deviates from the line indicating the reference characteristic. A fuel change determination unit 84 stores, in advance, the reference characteristic in FIG. 9 as the characteristic that is achieved when, for example, only gasoline is used as the fuel. If the point indicating the relationship between the engine torque $T_E$ that is detected by the torque detection unit 82 and the accelerator pedal operation amount Acc deviates from the line indicating the reference characteristic by an amount that falls outside a predetermined range that is set with variations in, for example, the properties of gasoline taken into account, it is determined that ethanol is blended with gasoline, and it is determined that the characteristic of fuel is changed. For example, when a predetermined amount of ethanol is blended with gasoline, the octane number of the fuel tends to increase. If the octane number increases, the ignition timing in the engine 8 is advanced because knocking is less likely to occur. When the accelerator pedal operation amount Acc is constant, the engine torque $T_E$ becomes higher than the engine torque correlated with the accelerator pedal operation amount Acc along the line indicating the reference characteristic.

The relationship between the amount, by which the point indicating the actual relationship between the engine torque $T_E$ and the accelerator pedal operation amount Acc deviates from the line indicating the reference characteristic, and the characteristic of fuel, that is, the blend ratio of ethanol to the entire fuel, is empirically determined in advance. A fuel characteristic determination unit 86 stores, in advance, the empirically determined relationship between the fuel characteristic and the engine torque $T_E$. When the fuel change determination unit 84 determines that the fuel characteristic has been changed, the fuel characteristic determination unit 86 estimates and determines the fuel characteristic, more specifically, the blend ratio of the ethanol to the entire fuel, based on the engine torque $T_E$ detected by the torque detection unit 82. More specifically, the fuel characteristic determination unit 86 estimates and determines the fuel characteristic, more specifically, the blend ratio of ethanol to the entire fuel, based on the deviation of the point indicating the relationship between engine torque $T_E$ and the accelerator pedal operation amount Acc from the line indicating the reference characteristic. In the description of the embodiment of the invention, the blend ratio of ethanol to the entire fuel signifies the ratio of the mass of ethanol to the mass of the entire fuel unless otherwise specified.

When the fuel change determination unit 84 determines that the fuel characteristic has been changed, a stop range changing unit 88 changes an operation stop range for the engine 8, which is an operation range where the operation of the engine 8 is stopped, based on the characteristic of fuel that is determined by the fuel characteristic determination unit 86 and that is burned in the engine 8. More specifically, in the above-described case, when the start-up performance of the engine 8 deteriorates due to a change in the fuel characteristic, more specifically, due to an increase in the blend ratio of ethanol to the entire fuel, the stop range changing unit 88 narrows the operation stop range for the engine 8, that is, the engine stop range. More specifically, in the above-described case, the stop range changing unit 88 further narrows the engine stop range as deterioration of the start-up performance of the engine 8 due to a change in the fuel characteristic proceeds.

Figure 10:
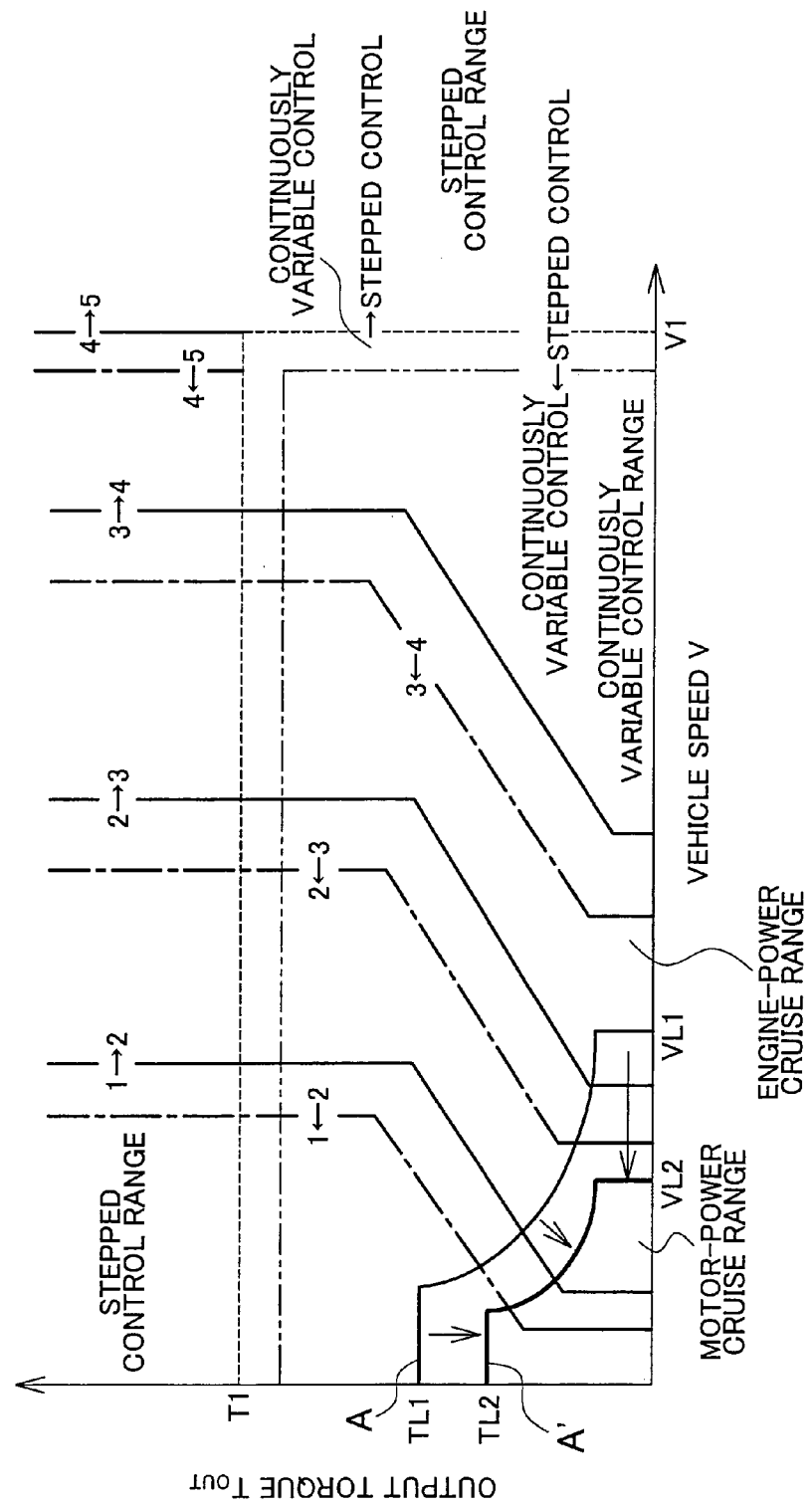
FIG. 10 is a graph showing an example of a drive power source switching diagram that is used to describe a manner for changing an engine stop range, FIG. 10 being mostly the same as FIG. 7 except that FIG. 10 includes a solid line A'.

FIG. 10 is an example of a drive power source switching diagram that is used to describe a mariner in which the engine stop range is changed. FIG. 10 is mostly the same as FIG. 7 except that FIG. 10 has a solid line A'. As in FIG. 7, in FIG. 10, the abscissa axis represents the vehicle speed V, and the ordinate axis represents the required output torque $T_{OUT}$ that is required to be output from the automatic shift unit 20 (shift mechanism 10). The required output torque $T_{OUT}$ corresponds to the accelerator pedal operation amount Acc, and the required output torque $T_{OUT}$ may be replaced with the accelerator pedal operation amount Acc in FIG. 10. The motor-power cruise range in FIGS. 7 and 10 is a cruise range in which the engine 8 is stopped and the second electric motor M2 is used as the drive power source that produces drive power to drive the vehicle. Therefore, the above-described engine stop range is a cruise range that is obtained by combining a cruise range in which neither the engine 8 nor the second electric motor M2 is used as the drive power source and the vehicle coasts with the above-described motor-power cruise range. If the motor-power cruise range is narrowed, the engine stop range is also narrowed. In the invention, even if the engine stop range is narrowed, the motor-power cruise range need not be always narrowed.

The manner in which the engine stop range is changed will be described in detail with reference to FIG. 10. When the start-up performance of the engine 8 deteriorates due to a change in the fuel characteristic, the stop range changing unit 88 shifts the boundary between the motor-power cruise range, which corresponds to the engine stop range, and the engine-power cruise range in FIG. 10 so that the vehicle speed V and the required output torque $T_{OUT}$ are decreased, that is, the stop range changing unit 88 shifts the boundary from the solid line A to the solid line A' to narrow the motor-power cruise range (engine stop range). The manner in which the engine stop range is changed will be described in a different way with reference to FIG. 10. If attention is given to the fact that the abscissa axis in FIG. 10 represents the vehicle speed V, the engine stop range that corresponds to the motor-power cruise range in FIG. 10 is a cruise range in which the engine 8 is determined to be stopped based on the vehicle speed V. Therefore, as deterioration of the start-up performance of the engine 8 due to a change in the fuel characteristic proceeds, the stop range changing unit 88 lowers the upper limit of the vehicle speed range that corresponds to the engine stop range (motor-power cruise range) to narrow the engine stop range. For example, in FIG. 10, if the boundary is shifted from the solid line A to the solid line A', the upper limit of the vehicle speed range is lowered from VL1 to VL2 on the abscissa axis in FIG. 10. If attention is given to the fact that the ordinate axis in FIG. 10 represents the required output torque $T_{OUT}$, the engine stop range that corresponds to the motor-power cruise range is a cruise range in which the engine 8 is determined to be stopped based on the accelerator pedal operation amount Acc that corresponds to the required output, torque $T_{OUT}$. Therefore, as deterioration of the start-up performance of the engine 8 due to a change in the fuel characteristic proceeds, the stop range changing unit 88 lowers the upper limit of the range of the accelerator pedal operation amount Acc that corresponds to the engine stop range (motor-power cruise range) to narrow the engine stop range. For example, in FIG. 10, if the boundary is shifted from the solid line A to the solid line A', the upper limit of the range of the accelerator pedal operation amount Acc is lowered from TL1 to TL2 on the ordinate axis in FIG. 10.

If the fuel change determination unit 84 determines that the fuel characteristic has not been changed, the stop range changing unit 88 does not change the engine stop range.

The torque detection unit 82, the fuel change determination unit 84, the fuel characteristic determination unit 86, and the stop range changing unit 88 may execute controls independently of a determination made by the fuel supply determination unit 80. However, preferably, the torque detection unit 82, the fuel change determination unit 84, the fuel characteristic determination unit 86, and the stop range changing unit 88 execute controls only when the fuel supply determination unit 80 determines that the amount of fuel in the fuel tank 70 has been increased in order to alleviate a control load placed on the electronic control unit 40.

FIG. 11 is a flowchart showing a main portion of control executed by the electronic control unit 40, that is, a control routine for alleviating unfavorable effects of deterioration of the start-up performance of the engine 8 due to a change in the fuel characteristic on a smooth motion of the hybrid vehicle. This control routine is executed in a considerably short cycle of, for example, several milliseconds to several tens of milliseconds.

First, in step (hereinafter, "step" will be omitted) SA1 that corresponds to the fuel supply determination unit 80, the electronic control unit 40 determines whether the amount of fuel in the fuel tank 70 of the hybrid vehicle has been increased. If an affirmative determination is made ("YES" in SA1), that is, if it is determined that the amount of fuel in the fuel tank 70 has been increased, SA2 is executed. On the other hand, if a negative determination is made ("NO" in SA1), the control routine in the flowchart ends. More specifically, whether the amount of fuel in the fuel tank 70 has been increased is determined based on a signal from the fuel gauge 72 that detects the amount of fuel in the fuel tank 70. When the fuel is supplied into the fuel tank 70, the fuel inlet lid 74 of the fuel tank 70 is opened. Therefore, if opening of the fuel inlet lid 74 is detected, it may be determined that the amount of fuel in the fuel tank 70 has been increased.

In SA2 that corresponds to the torque detection unit 82, the electronic control unit 40 detects the first electric motor torque $T_{M1}$ that is the reaction torque based on a value of an electric current supplied to the first electric motor M1, which is determined based on the control amount that is provided to the inverter 58, and calculates the engine torque $T_E$ based on the first electric motor torque $T_{M1}$, the gear ratio ρ0, etc. More specifically, when the engine torque $T_E$ and the first electric motor torque $T_{M1}$ are not zero and kept in balance, that is, when the vehicle is in the steady cruise mode, the engine torque $T_E$ is calculated by Equation 1.

In SA3 that corresponds to the fuel change determination unit 84 and the fuel characteristic determination unit 86, the electronic control unit 40 determines whether the point indicating the relationship between the engine torque $T_E$ that is calculated in SA2 and the accelerator pedal operation amount Acc deviates from the line indicating the reference characteristic in FIG. 9 that is stored in advance by an amount that falls outside the predetermined range that is set with variations in, for example, properties of the gasoline taken into account. If the point indicating the relationship deviates from the line indicating the reference characteristic by an amount that falls outside the predetermined range ("YES" in SA3), the electronic control unit 40 determines that ethanol is blended with gasoline and determines that the fuel characteristic has been changed. The electronic control unit 40 estimates and determines the characteristic of fuel, that is, the blend ratio of ethanol to the entire fuel based on the amount by which the point indicating the relationship between the engine torque $T_E$ calculated in SA2 and the accelerator pedal operation amount Acc deviates from the line indicating the reference characteristic. For example, if the relationship between the amount, by which the point indicating the actual relationship between the engine torque $T_E$ and the accelerator pedal operation amount Acc deviates from the line indicating the reference characteristic, and the bland ratio of ethanol to the entire fuel is empirically determined and the empirically determined relationship is stored in advance, the blend ratio of ethanol to the entire fuel is estimated based on the stored relationship.

If an affirmative determination is made in SA3 ("YES" in SA3), that is, if it is determined that the fuel characteristic has been changed, the electronic control unit 40 changes the operation stop range for the engine 8, in which the operation of the engine 8 is stopped, that is, the engine stop range, based on the fuel characteristic that is determined in SA3 and that is used in the operation of the engine 8. More specifically, the electronic control unit 40 narrows the engine stop range in SA4, when the start-up performance of the engine 8 deteriorates due to a change in the fuel characteristic, that is, due to an increase in the blend ratio of the ethanol to the entire fuel.

If a negative determination is made in SA3, the electronic control unit 40 keeps the engine stop range unchanged in SA5. SA4 and SA5 correspond to the stop range changing unit 88.

The embodiment of the invention produces the following effects A1) to A11). A1) The engine stop range that is the cruise range in which the operation of the engine 8 is stopped is changed based on the characteristic of fuel that is burned in the engine 8. Therefore, the engine 8 is stopped or started up under the cruise condition that suits the fuel characteristic. Even if the start-up performance of the engine 8 varies due to the variation of the fuel characteristic, it is possible to alleviate the unfavorable effects of the variation of start-up performance on a smooth motion of the hybrid vehicle.

A2) If the fuel change determination unit 84 makes an affirmative determination, the stop range changing unit 88 changes the engine stop range based on the characteristic of fuel that is burned in the engine 8. More specifically, the engine stop range is narrowed when the start-up performance of the engine 8 deteriorates due to a change in the fuel characteristic. Therefore, in the cruise range in which it is estimated be difficult to start up the engine 8 smoothly due to deterioration of the start-up performance of the engine 8, the engine 8 is not stopped, which makes it possible to alleviate the unfavorable effects of deterioration of the start-up performance of the engine 8 on a smooth motion of the hybrid vehicle.

A3) When the fuel change determination unit 84 makes an affirmative determination, the stop range changing unit 88 changes the engine stop range based on the fuel characteristic. More specifically, as deterioration of the start-up performance of the engine 8 due to a change in the fuel characteristic proceeds, the engine stop range is further narrowed. The cruise range, in which it is estimated to be difficult to smoothly start up the engine 8, increases as deterioration of the start-up performance of the engine 8 proceeds. However, according to the embodiment of the invention, in such cruise range, the engine 8 is not stopped, which makes it possible to alleviate unfavorable effects of deterioration of the start-up performance of the engine 8 on a smooth motion of the hybrid vehicle.

A4) In the embodiment of the invention, when the engine 8 is started, the first electric motor M1 is rotated at the higher first electric motor rotational speed $N_{M1}$ in the same rotational direction of the second electric motor M2 and the engine speed $N_E$ is increased. At this time, the first electric motor torque $T_{M1}$ and the output torque $T_{M2}$ from the second electric motor M2 (hereinafter, referred to as "second electric motor torque $T_{M2}$") counter the rotational resistance of the engine 8. Therefore, in order to more promptly increase the engine speed $N_E$ to smoothly start up the engine because the start-up performance of the engine 8 has deteriorated, the first electric motor torque $T_{M1}$ and the second electric motor torque $T_{M2}$, which are used to increase the engine speed $N_E$, need to be increased. However, if the gear ratio of the automatic shift unit 20 is constant, as the vehicle speed V increases, the second electric motor rotational speed $N_{M2}$ increases and the rated torque of the second electric motor M2 decreases. When the engine speed $N_E$ is constant, for example, when the engine speed $N_E$ is zero, as the second electric motor rotational speed $N_{M2}$ increases, the first electric motor M1 rotates at the higher rotational speed $N_{M1}$ in the direction opposite to the direction in which the second electric motor M2 rotates, and the rated torque of the first electric motor M1 decreases as indicated in the collinear diagram in FIG. 3. The engine stop range is a cruise range in which the engine 8 is determined to be stopped based on the vehicle speed V. Therefore, in the cruise range in which it is estimated that the first electric motor torque $T_{M1}$ and the second electric motor torque $T_{M2}$, which are used to increase the engine speed $N_E$, are insufficient because the start-up performance of the engine 8 varies due to variation in the fuel characteristic and it is difficult to smoothly start the engine 8, the engine 8 is not stopped, which makes it possible to alleviate unfavorable effects of deterioration of the start-up performance of the engine 8 on a smooth motion of the hybrid vehicle.

A5) As deterioration of the start-up performance of the engine 8 due to a change in the fuel characteristic proceeds, the stop range changing unit 88 lowers the upper limit of the vehicle speed range that corresponds to the engine stop range (motor-power cruise range) to narrow the engine stop range. Therefore, when the vehicle speed is high, that is, when the first electric motor torque $T_{M1}$ and the second electric motor torque $T_{M2}$, which are used to increase the engine speed $N_E$ when the engine starts up, decrease, the engine 8 is not stopped, which makes it possible to alleviate unfavorable effects of deterioration of the start-up performance of the engine 8 on a smooth motion of the hybrid vehicle.

A6) As the accelerator pedal operation amount Acc increases, the required output torque $T_{OUT}$ that is required to be output from the automatic shift unit 20 increases. In this case, when the engine 8 is started up, the torque that can be used to start up the engine, which is obtained by subtracting the torque used to drive the vehicle from the rated torque of the second electric motor M2, decreases as the accelerator pedal operation amount Acc increases. However, the engine stop range is a cruise range in which the engine 8 is determined to be stopped based on the accelerator pedal operation amount Acc. Therefore, in the range of the accelerator pedal operation amount Acc, in which it is estimated that the second electric motor torque $T_{M2}$ that can be used to start up the engine is insufficient because the start-up performance of the engine 8 varies due to variation of the fuel characteristic and it is difficult to smoothly start up the engine, the engine is not stopped, which makes it possible to alleviate unfavorable effects of deterioration of the start-up performance of the engine 8 on a smooth motion of the hybrid vehicle.

A7) As deterioration of the start-up performance of the engine 8 due to a change in the fuel characteristic proceeds, the stop range changing unit 88 lowers the upper limit of the accelerator pedal operation amount Acc that corresponds to the engine stop range (motor-power cruise range) to narrow the engine stop range. Therefore, when the accelerator pedal operation amount Acc is large, that is, when the first electric motor torque $T_{M1}$ and the second electric motor torque $T_{M2}$, which are used to increase the engine speed $N_E$ when the engine is started, decrease, the engine 8 is not stopped, which makes it possible to alleviate the unfavorable effects of deterioration of the start-up performance of the engine 8 on a smooth motion of the hybrid vehicle.

A8) When the fuel supply determination unit 80 determines that the amount of fuel in the fuel tank 70 has been increased, the torque detection unit 82, the fuel change determination unit 84, the fuel characteristic determination unit 86 and the stop range changing unit 88 execute the controls. Therefore, these units execute control on an as-required basis, which alleviates the control load placed on electronic control unit 40.

A9) According to the embodiment of the invention, when opening of the fuel inlet lid 74 is detected, the fuel supply determination unit 80 may determine that the amount of fuel in the fuel tank 70 has been increased. In this case, the torque detection unit 82, the fuel change determination unit 84, the fuel characteristic determination unit 86, and the stop range changing unit 88 execute the controls on an as-required basis. Therefore, it is possible to alleviate the control load placed on the electronic control unit 40.

A10) The shift mechanism 10 includes the differential unit 11 which has the power split mechanism 16 arranged between the engine 8 and the drive wheels 38, and the first electric motor M1 connected to the power split mechanism 16. In the differential unit 11, the differential state of the power split mechanism 16 is controlled by controlling the first electric motor M1. Therefore, the engine 8 is driven independently of the vehicle speed V, that is, the rotational speed of the drive wheels 38, which enhances the fuel efficiency of the hybrid vehicle. Also, idling the first electric motor M1 enables the vehicle to travel with the engine 8 stopped.

A11) The output characteristic of the engine 8 varies depending on the characteristic of fuel that is supplied to the engine 8, more specifically, depending on the blend ratio of the ethanol to the entire fuel. However, according to the embodiment of the invention, the engine torque $T_E$ is detected based on the first electric motor torque $T_{M1}$ that counters the engine torque $T_E$, and the fuel characteristic, more specifically, the blend ratio of the ethanol to the entire fuel is estimated and determined based on the engine torque $T_E$. Therefore, it is possible to easily determine the fuel characteristic by detecting the first electric motor torque $T_{M1}$.

While the invention has been described with reference to the example embodiment thereof, it is to be understood that the invention is not limited to the described embodiment or construction. To the contrary, the invention is intended to cover various modifications and equivalent arrangements. In addition, while the various elements of the described invention are shown in various example combinations and configurations, other combinations and configurations, including more, less or only a single element, are also within the scope of the appended claims.

For example, deterioration of the start-up performance of the engine 8 proceeds as the temperature of the engine 8, which is detected as the temperature of a coolant within the engine 8, becomes lower. Therefore, the engine stop range may be a cruise range in which the engine 8 is determined to be stopped based on the temperature of the engine 8. For example, a permission to stop the engine 8 is usually given when the temperature of the engine 8 is equal to or higher than 0° C. However, if the blend ratio of the ethanol to the entire fuel exceeds a predetermined value, a permission to stop the engine 8 may be given when the temperature of the engine 8 is equal to or higher than 40° C. When the temperature of the engine 8 is lower than 40° C., the engine stop range may be set to zero. Therefore, a permission to stop the engine 8 is not given, and the cruise mode is not switched from the engine-power cruise mode to the motor-power cruise mode. In this case, in the temperature range for the engine 8 in which it is estimated to be difficult to smoothly start up the engine 8 because the start-up performance of the engine 8 varies due to variation of the fuel characteristic, the engine 8 is not stopped, which makes it possible to alleviate unfavorable effects of deterioration of the start-up performance of the engine 8 on a smooth motion of the hybrid vehicle.

As the temperature of the engine 8 decreases, the stop range changing unit 88 may further narrow the engine stop range by lowering at least one of the upper limit of the range of the vehicle speed V and the upper limit of the range of the accelerator pedal operation amount Acc that correspond to the engine stop range. In this case, when the temperature of the engine 8 is low, that is, when the start-up performance of the engine 8 deteriorates significantly due to a change in the fuel characteristic, the engine 8 is not stopped, which makes it possible to alleviate unfavorable effects of deterioration of the start-up performance of the engine 8 on a smooth motion of the hybrid vehicle.

In the embodiment of the invention, the shift mechanism 10 includes the power split mechanism 16, which serves as a differential mechanism, and the first electric motor M1. However, the invention may be applied to a so-called parallel hybrid vehicle in which the first electric motor M1 and the power split mechanism 16 are not provided, and the engine 8, a clutch, the second electric motor M2, the automatic shift unit 20 and the drive wheels 38 are connected in tandem with each other. When the engine is started up in such parallel hybrid vehicle, the clutch between the engine 8 and the second electric motor M2 is applied to increase the second electric motor torque $T_{M2}$. When the reverse drive power from the drive wheels 38 is available, it is also used to increase the engine speed $N_E$. The clutch between the engine 8 and the second electric motor M2 is provided on an as-required basis. Therefore, the invention may be applied to a parallel hybrid vehicle without such clutch.

When the fuel change determination unit 84 makes an affirmative determination, the stop range changing unit 88 changes the engine stop range. However, because the stop range changing unit 88 changes the engine stop range based on the fuel characteristic, the stop range changing unit 88 may change the engine stop range independently of the determination made by the fuel change determination unit 84.

In the embodiment of the invention, ethanol is blended with the gasoline fuel that is supplied to the engine 8. However, the main component of the fuel may be light oil or hydrogen. The fuel characteristic is not limited to ethanol-blended fuel. Therefore, the fuel characteristic determination unit 86 not only estimates the blend ratio of ethanol to the entire fuel but also estimates and determines the fuel characteristic.

In the embodiment of the invention, the first electric motor M1 and the second electric motor M2 are included in the differential unit 11. Alternatively, the first electric motor M1 and the second electric motor M2 may be provided separately from the differential unit 11.

In the embodiment of the invention, when the operating state of the first electric motor M1 is controlled, the differential unit 11 (power split mechanism 16) serves as an electric continuously variable transmission of which the gear ratio γ0 is changed continuously in a range from the minimum value γ0min to the maximum value γ0max. Alternatively, the gear ratio γ0 of the differential unit 11 may be changed in a stepwise manner, instead of continuously, using the differential effect.

In the shift mechanism 10 according to the embodiment of the invention, the engine 8 and the differential unit 11 are connected directly with each other. Alternatively, the engine 8 may be connected to the differential unit 11 via an application element, for example, a clutch.

In the shift mechanism 10 according to the embodiment of the invention, the first electric motor M1 and the second rotational element RE2 are connected directly with each other, and the second electric motor M2 and the third rotational element RE3 are connected directly with each other. Alternatively, the first electric motor M2 may be connected to the second rotational element RE2 via an application element, for example, a clutch, and the second electric motor M2 may be connected to the third rotational element RE3 via an application element, for example, a clutch.

In the power transmission path that extends from the engine 8 to the drive wheels 8 in the embodiment of the invention, the automatic shift unit 20 is arranged immediately downstream of the differential unit 11. Alternatively, the differential unit 11 may be arranged immediately downstream of the automatic shift unit 20. That is, the automatic shift unit 20 may be arranged at any position as long as the automatic shift unit 20 constitutes part of the power transmission path that extends from the engine 8 to the drive wheels 38.

In the embodiment of the invention, in FIG. 1, the differential unit 11 and the automatic shift unit 20 are connected in tandem with each other. However, the invention may be applicable even in a case in which the differential unit 11 and the automatic shift unit 20 are not mechanically independent of each other, as long as the shift mechanism 10 has an electric differential function for electrically changing the differential state and a function for changing gears based on a principle that differs from a principle of gear shift performed using the electric differential function.

In the embodiment of the invention, the power split mechanism 16 is a single planetary gear unit. Alternatively, the power split mechanism 16 may be a double planetary gear unit.

In the embodiment of the invention, the engine 8 is connected to the first rotational element RE1 that constitutes the differential planetary gear unit 24 so that the drive power from the engine 8 is transmittable to the first rotational element RE1, the first electric motor M1 is connected to the second rotational element RE2 so that the drive power from the first electric motor M1 is transmittable to the second rotational element RE2, and the power transmission path to the drive wheels 38 is connected to the third rotational element RE3. However, the invention may be applicable to, for example, a structure in which two planetary gear units are connected to each other at part of rotational elements that constitute the two planetary gear units; an engine, an electric motor and drive wheels are connected to the rotational elements of the planetary gear units so that drive power is transmittable among these components; and the shift mode is switched between the continuously variable shift mode and the stepped shift mode by controlling a clutch or a brake that is connected to the rotational element of the planetary gear units.

In the embodiment of the invention, the automatic shift unit 20 is a shift unit that functions as a stepped automatic transmission. Alternatively, the automatic shift unit 20 may be a continuously variable transmission. Also, the invention may be applicable to a structure without the automatic shift unit 20.

In the embodiment of the invention, the second electric motor M2 is connected directly with the transmitting member 18. However, the position of the second electric motor M2 is not limited to this. For example, the second electric motor M2 may be connected to the power transmission path, at any position, from the differential unit 11 to the drive wheels 38 directly or via, for example, a transmission, a planetary gear unit or an application device.

In the power split mechanism 16 according to the embodiment of the invention, the differential carrier CA0 is connected to the engine 8, the differential sun gear S0 is connected to the first electric motor M1, and the differential ring gear R0 is connected to the transmitting member 18. However, the manner in which these members are connected to each other is not limited to this. The engine 8, the first electric motor M1 and the transmitting member 18 may be connected to any of the three rotating elements CA0, S0 and R0 of the differential planetary gear unit 24.

In the embodiment of the invention, the engine 8 is connected directly with the input shaft 14. However, the engine need not be connected directly with the input shaft 14. For example, the engine 8 may be operatively connected to the input shaft 14 via a gear or a belt. In addition, the engine 8 need not be provided coaxially with the input shaft 14.

In the embodiment of the invention, the first electric motor M1 and the second electric motor M2 are provided coaxially with the input shaft 14, the first electric motor M1 is connected to the differential sun gear S0, and the second electric motor M2 is connected to the transmitting member 18. However, these members need not be arranged in this way. For example, the first electric motor M1 may be operatively connected to the differential sun gear S0 via a gear, a belt or a reducer, and the second electric motor M2 may be connected to the transmitting member 18 via a gear, a belt or a reducer.

In the embodiment of the invention, the automatic shift unit 20 is connected in tandem with the differential unit 11 via the transmitting member 18. Alternatively, a counter shaft may be provided in parallel with the input shaft 14, and the automatic shift unit 20 may be provided coaxially with the counter shaft. In this case, the differential unit 11 and the automatic shift unit 20 may be connected to each other via paired counter gears, paired transmitting members that are a sprocket and a chain, which serve as the transmitting member 18 so that drive power is transmitted from the differential unit 11 to the automatic shift unit 20.

The power split mechanism 16 according to the embodiment of the invention is formed of one set of planetary gear units. Alternatively, the power split mechanism 16 may be formed of two or more sets of planetary gear units, and may function as a transmission having three or more gears in the non-differential mode (fixed shift mode).

In the embodiment of the invention, the second electric motor M2 is connected to the transmission member 18 that constitutes part of the power transmission path that extends from the engine 8 to the drive wheels 38. Alternatively, the shift mechanism 10 may be structured in such a manner that the second electric motor M2 is connected to the power transmission path, and may be connected to the power split mechanism 16 via an application element, for example, a clutch, and the differential state of the power split mechanism 16 is controlled by the second electric motor M2 instead of the first electric motor M1.

The invention claimed is:

1. A control apparatus for a power transmission system of a hybrid vehicle including an internal combustion engine and an electric motor for driving the hybrid vehicle, comprising:
 an operation stop range changing unit that changes an operation stop range for the internal combustion engine, which is a cruise range in which an operation of the internal combustion engine is stopped, based on a type of fuel that is burned in the internal combustion engine, wherein changing the operation stop range for the internal combustion engine based on the type of fuel is narrowing the operation stop range for the internal combustion engine when the type of fuel has been changed and when start-up performance of the internal combustion engine deteriorates.

2. The control apparatus according to claim 1, wherein when the operation stop range for the internal combustion engine is changed, an operation range for the electric motor, which is a cruise range in which the electric motor is operated, is kept unchanged.

3. The control apparatus according to claim 1, wherein when the operation stop range for the internal combustion engine is changed, an operation range for the electric motor, which is a cruise range in which the electric motor is operated, is changed in accordance with the change in the operation stop range for the internal combustion engine.

4. The control apparatus according to claim 3, wherein when the operation stop range for the internal combustion engine is narrowed, the operation range for the electric motor is narrowed.

5. The control apparatus according to claim 1, wherein the operation stop range for the internal combustion engine is a cruise range in which the operation of the internal combustion engine is determined to be stopped based on a vehicle speed.

6. The control apparatus according to claim 5, wherein the vehicle speed, at which the operation of the internal combustion engine is determined to be stopped, is lowered when start-up performance of the internal combustion engine deteriorates.

7. The control apparatus according to claim 1, wherein the operation stop range for the internal combustion engine is a cruise range in which the operation of the internal combustion engine is determined to be stopped based on an accelerator pedal operation amount.

8. The control apparatus according to claim 7, wherein the accelerator pedal operation amount, at which the operation of the internal combustion engine 8 is determined to be stopped, is decreased when start-up performance of the internal combustion engine deteriorates.

9. The control apparatus according to claim 1, wherein the operation stop range for the internal combustion engine is a cruise range in which the operation of the internal combustion engine is determined to be stopped based on a temperature of the internal combustion engine.

10. The control apparatus according to claim 9, wherein the temperature, at which the operation of the internal combustion engine is determined to be stopped, is raised when start-up performance of the internal combustion engine deteriorates.

11. The control apparatus according to claim 1, wherein the type of fuel is determined when an amount of fuel in a fuel tank provided in the hybrid vehicle increases.

12. The control apparatus according to claim 1, wherein the type of fuel is determined when opening of a lid for a fuel inlet of a fuel tank provided in the hybrid vehicle is detected.

13. The control apparatus according to claim 1, wherein: the fuel is gasoline; and the type of fuel is determined by detecting a ratio of ethanol to ethanol-blended-gasoline.

14. The control apparatus according to claim 1, wherein the power transmission system includes an electric differential unit which has a differential mechanism that is arranged between the internal combustion engine and a drive wheel, and a differential electric motor that is connected to the differential mechanism in such a manner that drive power is transmittable between the differential mechanism and the differential electric motor, and in which a differential state of the differential mechanism is controlled by controlling an operation state of the differential electric motor.

15. The control apparatus according to claim 1, wherein the operation stop range for the internal combustion engine includes an operation range for the electric motor, which is a cruise range in which the electric motor is operated, and a cruise range in which both the internal combustion engine and the electric motor are stopped.

16. The control apparatus according to claim 1, wherein the change in the type of fuel is a change in a blend ratio of the fuel.

17. The control apparatus according to claim 16, wherein the fuel is an ethanol blended fuel.

18. The control apparatus according to claim 1, wherein the change in the type of fuel is a change in an octane number of the fuel.

19. A control method for a power transmission system of a hybrid vehicle including an internal combustion engine and an electric motor for driving the hybrid vehicle, comprising:
   changing an operation stop range for the internal combustion engine, which is a cruise range in which an operation of the internal combustion engine is stopped, based on a type of fuel that is burned in the internal combustion engine, wherein changing the operation stop range for the internal combustion engine based on the type of fuel is narrowing the operation stop range for the internal combustion engine when the type of fuel has been changed and when start-up performance of the internal combustion engine deteriorates.

20. The control method according to claim 19, wherein the change in the type of fuel is a change in a blend ratio of the fuel.

21. The control method according to claim 20, wherein the fuel is an ethanol blended fuel.

22. The control method according to claim 19, wherein the change in the type of fuel is a change in an octane number of the fuel.

* * * * *